Feb. 1, 1944.  A. J. FETTIG  2,340,372
CALCULATING MACHINE
Filed Oct. 16, 1939  12 Sheets-Sheet 1

Fig. 1.

| CUSTOMERS BILL | | | | CASH STUB | | | COLLECTION STUB | | | LEDGER STUB | | |
|---|---|---|---|---|---|---|---|---|---|---|---|---|
| DATE | PRES. | PREV. | USED | NET | DATE | USED | NET | DATE | USED | NET | DATE | USED | NET |
| MAY 15 | 888 | 5 55 | 333 | 4 50 | MAY 15 | 333 | 4 50 | MAY 15 | 333 | 4 50 | MAY 15 | 333 | 4 50 |
| | | | | 1 25 | MAY 15 | 333 | 1 25 | MAY 15 | 333 | 1 25 | MAY 15 | 333 | 1 25 |
| | | | 333 | 5 75¢ | MAY 15 | 333 | 5 75¢ | MAY 15 | 333 | 5 75¢ | MAY 15 | 333 | 5 75¢ |

INVENTOR
Arthur J. Fettig
BY Davis, Lindsey, Smith & Shonts
ATTORNEYS

Feb. 1, 1944.  A. J. FETTIG  2,340,372
CALCULATING MACHINE
Filed Oct. 16, 1939  12 Sheets-Sheet 5
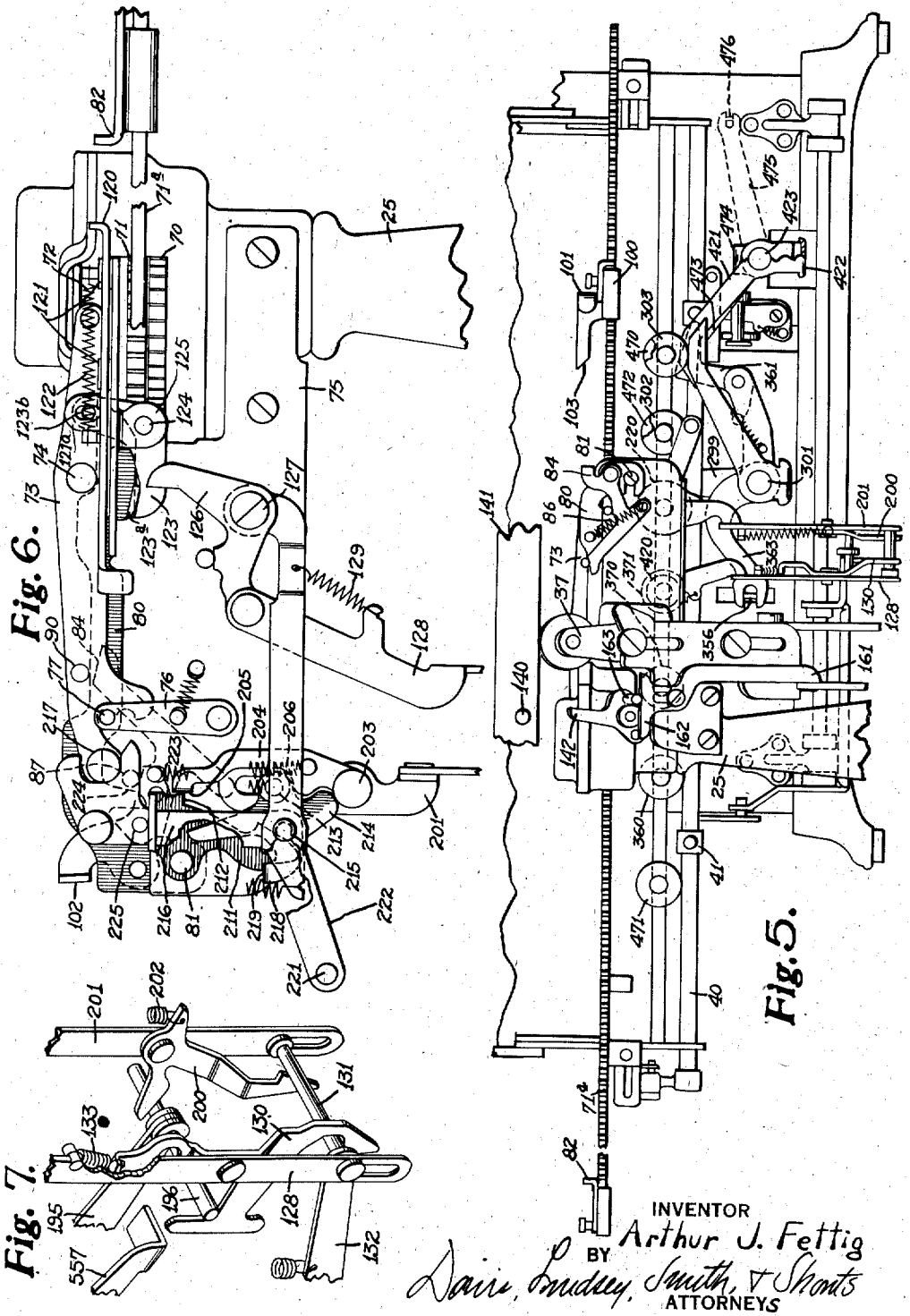
INVENTOR
Arthur J. Fettig
BY
Davis, Lindsey, Smith, & Shonts
ATTORNEYS Feb. 1, 1944.  A. J. FETTIG  2,340,372
CALCULATING MACHINE
Filed Oct. 16, 1939  12 Sheets-Sheet 6
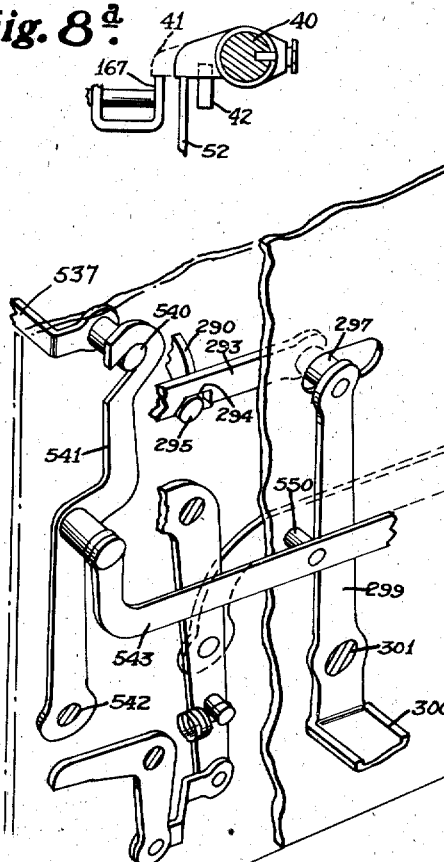
Fig. 8ᵃ.
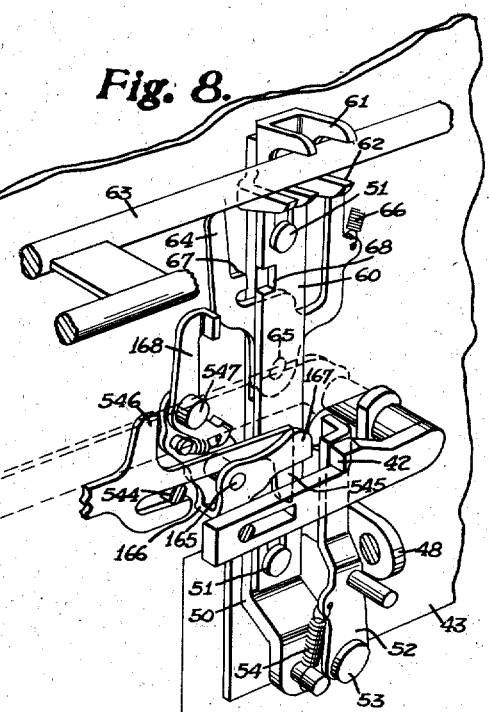
Fig. 8.
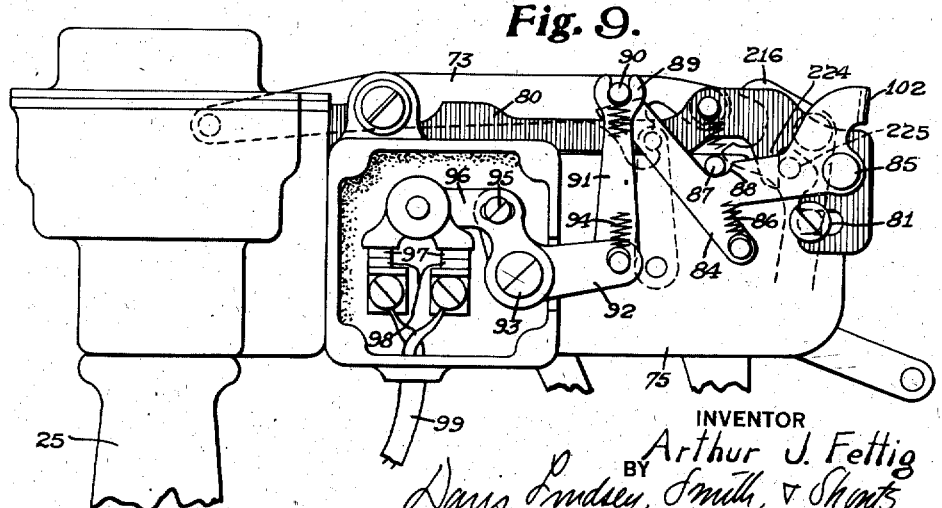
Fig. 9.
INVENTOR
Arthur J. Fettig
BY
Davis, Lindsey, Smith, & Shorts
ATTORNEYS Feb. 1, 1944. A. J. FETTIG 2,340,372
CALCULATING MACHINE
Filed Oct. 16, 1939 12 Sheets-Sheet 9

INVENTOR
Arthur J. Fettig
BY
Harris, Lindsey, Smith, & Shoats
ATTORNEYS

Feb. 1, 1944.  A. J. FETTIG  2,340,372
CALCULATING MACHINE
Filed Oct. 16, 1939  12 Sheets-Sheet 11

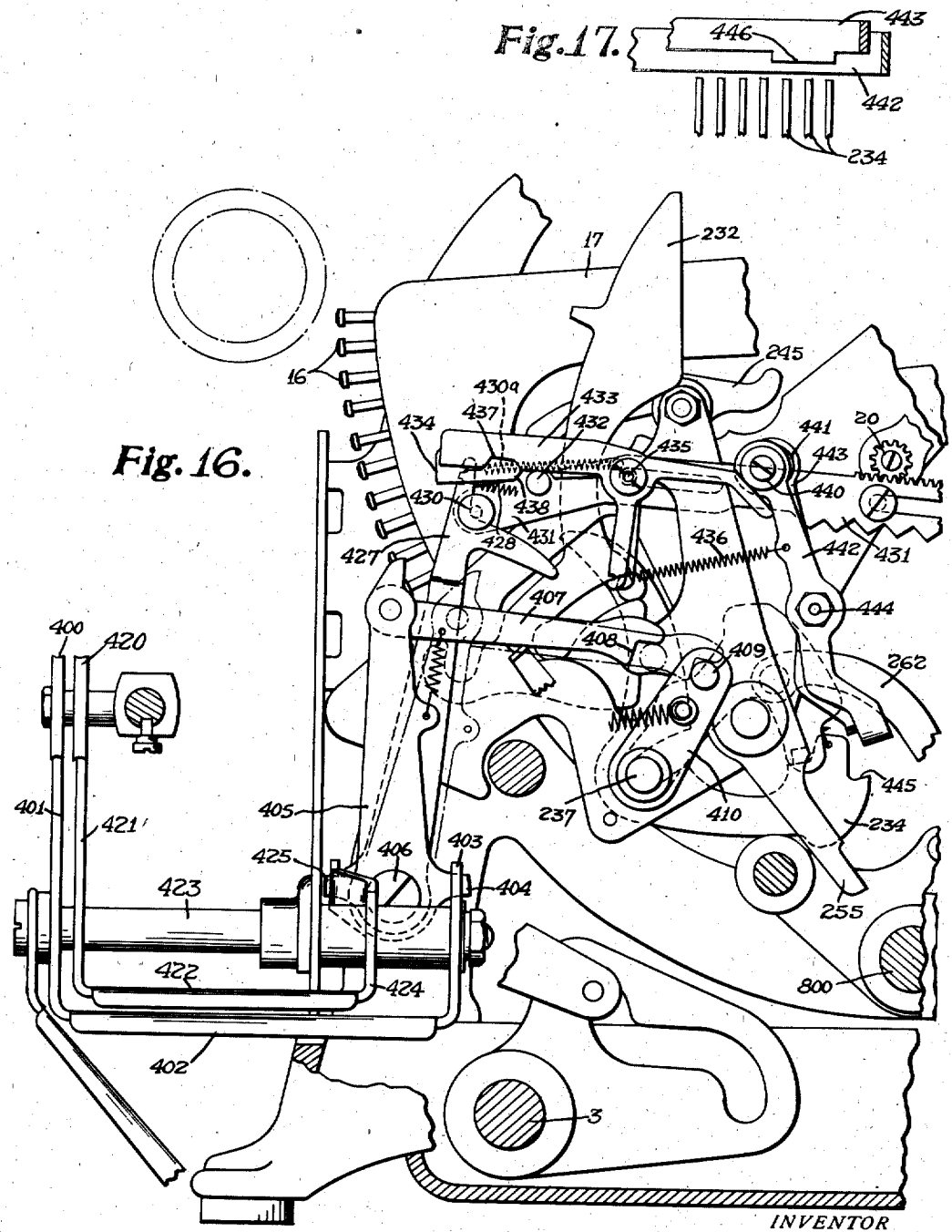

Patented Feb. 1, 1944

2,340,372

UNITED STATES PATENT OFFICE 2,340,372

CALCULATING MACHINE

Arthur J. Fettig, Detroit, Mich., assignor to Burroughs Adding Machine Company, Detroit, Mich., a corporation of Michigan Application October 16, 1939, Serial No. 299,682

42 Claims. (Cl. 235—60)

This invention relates to a calculating machine. It is directed particularly to an improved machine for use in preparing public utility bills where, after an item or items are entered in the machine, said items must be printed in a multiplicity of places or columns on the bill.

Public utility bills are ordinarily made out on relatively long narrow forms which comprise a main section forming a "customer's bill," together with a plurality of detachable stubs such as the "cash" stub, the "collection" stub, and the "ledger" stub. The exact form of the bill and the number of stubs may vary with different utility companies but the general practice is to have a form that is made up of the customer's bill and three detachable stubs.

When an operator makes out a bill of this character for gas or electricity, he enters (1) the date, (2) the "present" or new meter reading, and (3) the "previous" or old meter reading. These items are then printed. Next, he enters (1) the difference between the two meter readings, which constitutes the "consumption," and (2) the amount in dollars and cents that is due from the customer. The "consumption" is read by the operator from a meter reader's book where it has been precalculated and the amount due is determined from rate tables and it also is precalculated. These items are then printed and the first print occurs on the "customer's bill" portion of the form. However, these same items should also be printed on each of the three stubs which means that the same items must be printed four times. Four calculations are unnecessary, and as far as the operator is concerned, he has entered the item once and should not be required to do so again. Provision must be made to have the machine print the items four times without any attention on the part of the operator.

These public utility bills must be made out every month and, in large and medium sized centers of population, they have to be made out by the thousands. Speed and ease of operation thus become highly important. One method of making out these bills has been to use an ordinary calculating machine and to arrange the machine so that, after the operator has made the proper entry, the machine automatically will go through a number of repeat machine cycles to print the items in the necessary places, the carriage traveling through the proper columns during the automatic operation. This is not always as fast as desirable and, furthermore, it tends to wear the machine rapidly because numerous operations of the complete calculating machine are required, during which operations no real calculating functions are necessary. Another solution has been to provide large complicated machines with a plurality of printing mechanisms, with arrangements for causing a plurality of these printing mechanisms to operate simultaneously to thereby print the same items in several columns or spaces. But this involves an expensive, complicated machine that is specialized for this work and which is not particularly suitable for any other work.

The present invention comprehends accomplishing the results with an ordinary calculating machine without requiring a plurality of machine cycles and without requiring a multiplicity of printing mechanisms. Briefly, the result is accomplished by momentarily arresting certain portions of the machine while allowing others to operate, the arrangement being that, while certain portions of the machine are blocked and while the printing mechanism remains indexed, a relative lateral movement between the bill and printing mechanism is caused to take place during which the printing mechanism is operated a plurality of times to make the number of prints required, after which the portion of the machine that was momentarily blocked is released to complete the cycle.

The general object of the invention is to provide an improved calculating machine.

A more particular object is to provide an improved calculating machine in which an item may be printed a multiplicity of times during a machine cycle.

A further object is to provide improved controlling mechanism for the paper carriage of a calculating machine.

Other and more particular objects will appear from the following specification and the drawings.

An embodiment of the invention is shown in the accompanying drawings in which:

Figure 1 is an illustration of a public utility bill with certain examples of work thereon, said view also illustrating diagrammatically the location of certain carriage control rolls relative to the different columns or spaces on the bill.

Fig. 5 is a partial rear elevation of the machine with the carriage in its column 1 position, that is, its starting position at the right, viewing the machine from the front.

Fig. 6 is a partial front view of the carriage return mechanism, this view being taken as though the main body of the machine were removed and the carriage return mechanism were viewed looking toward the rear of the machine.

Fig. 7 is a partial perspective of certain parts that govern the carriage return.

Fig. 8 is a partial perspective view of the machine viewed from the right rear corner and showing some of the control mechanism on the rear, the parts being in normal position.

Fig. 8ᵃ is a small detail section of a portion of the carriage tabulating mechanism.

Fig. 9 is a partial rear view of the carriage return mechanism, showing especially the control of the motor.

Figure 10:
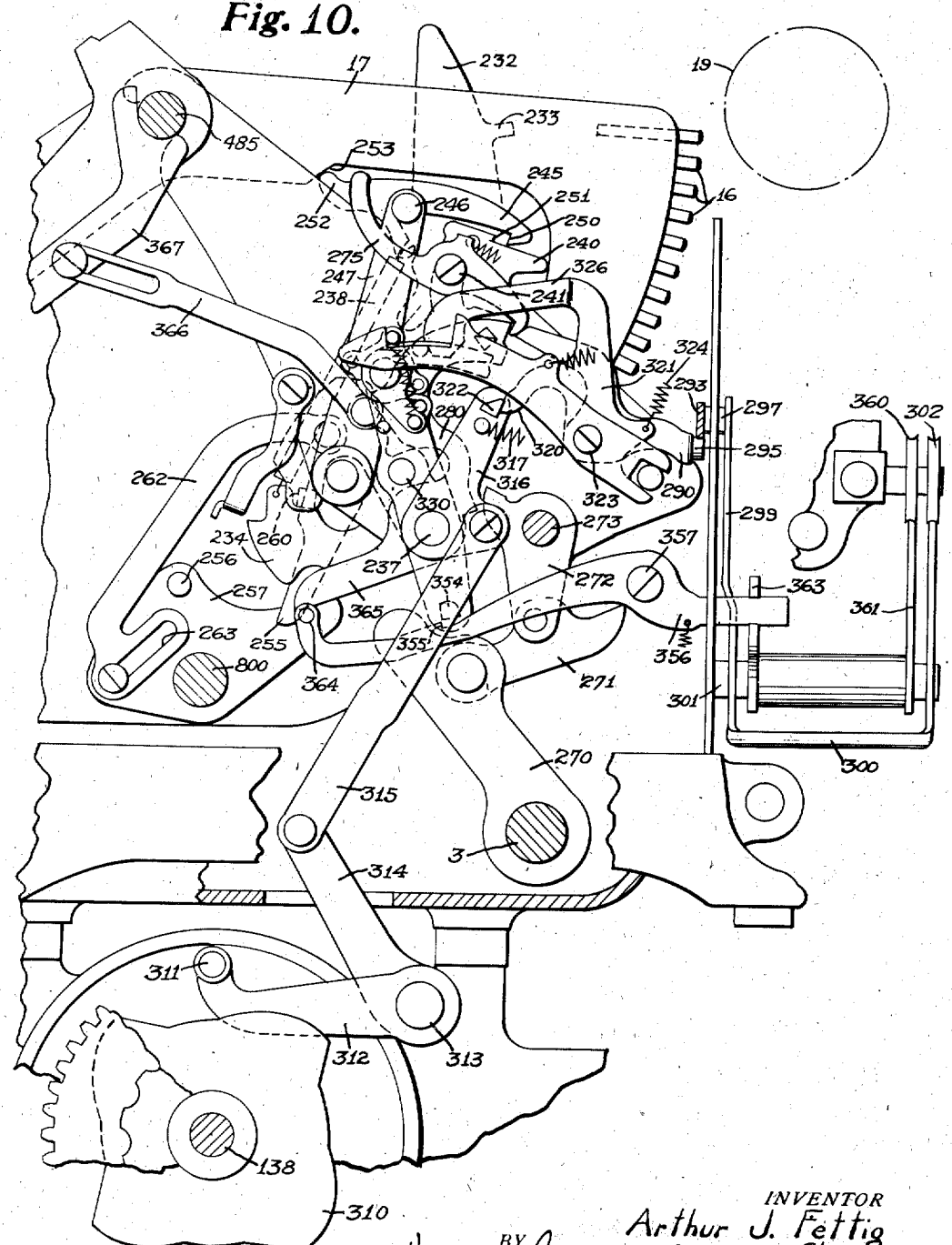

Fig. 10 is a partial right side elevation of the rear of the machine illustrating the printing mechanism, the parts being in normal position.

Figure 11:
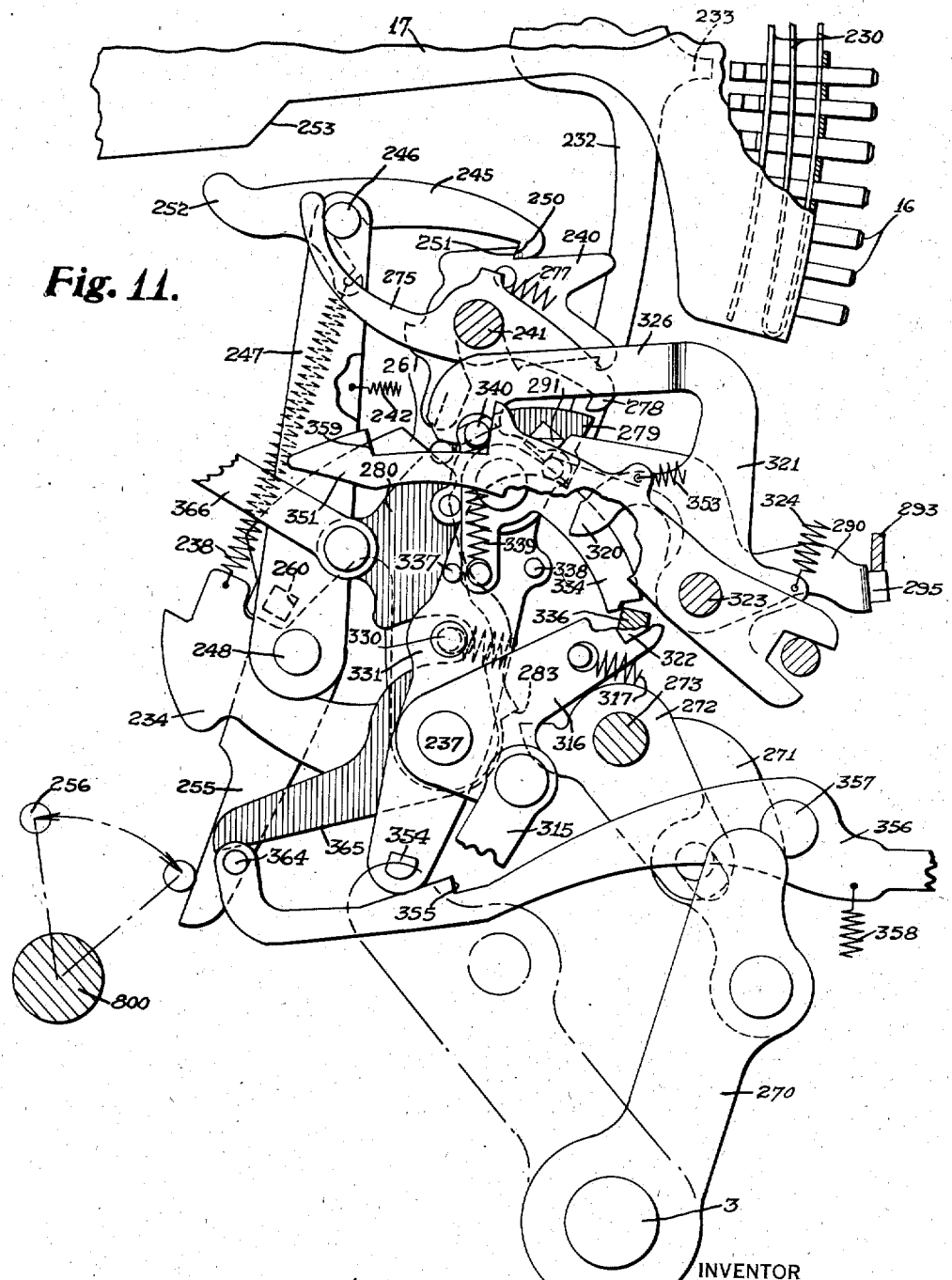

Fig. 11 is another partial right side elevation of the printing mechanism with the parts shown in the positions they occupy immediately prior to the time certain portions of the machine are blocked during the machine cycle.

Figures 12, 13:
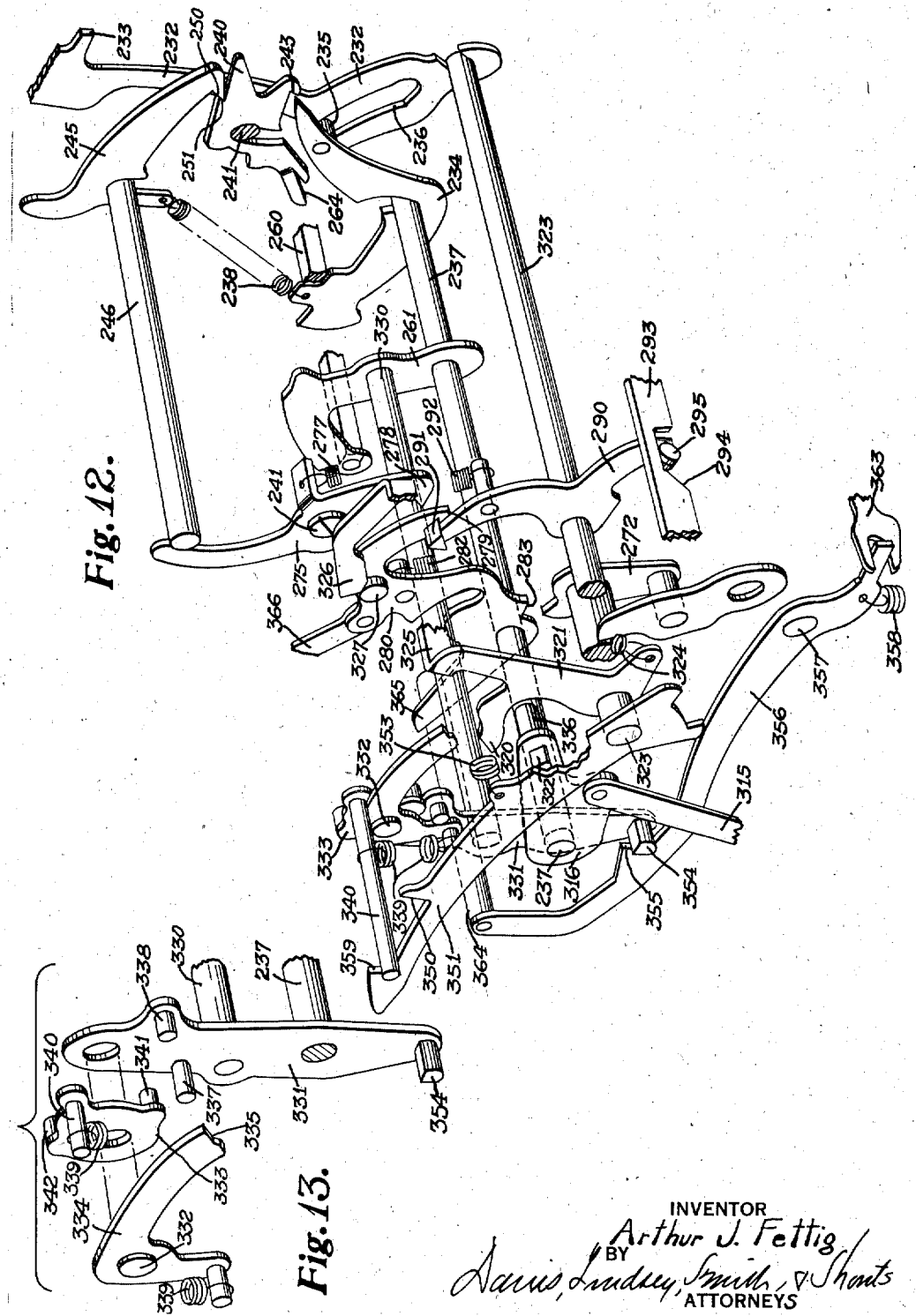

Fig. 12 is a partial perspective of certain portions of the printing mechanism showing the parts in the position they occupy while the paper carriage is being moved through certain columnar positions.

Fig. 13 is a separated perspective of certain of the details illustrated in Fig. 12.

Figure 14:
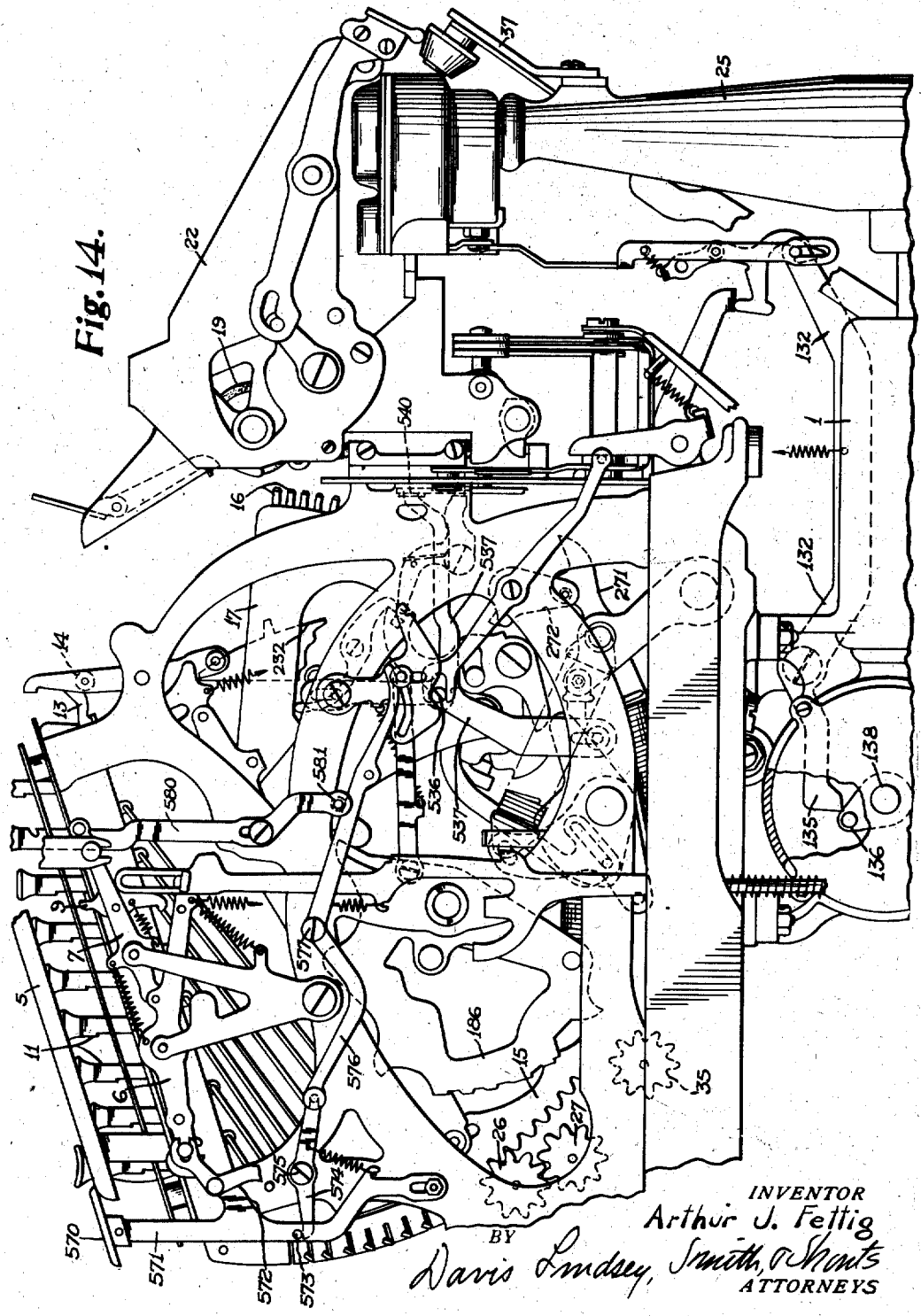

Fig. 14 is a partial right side elevation of the machine with a modified form of the invention applied thereto, the parts being shown in normal position.

Figure 15:
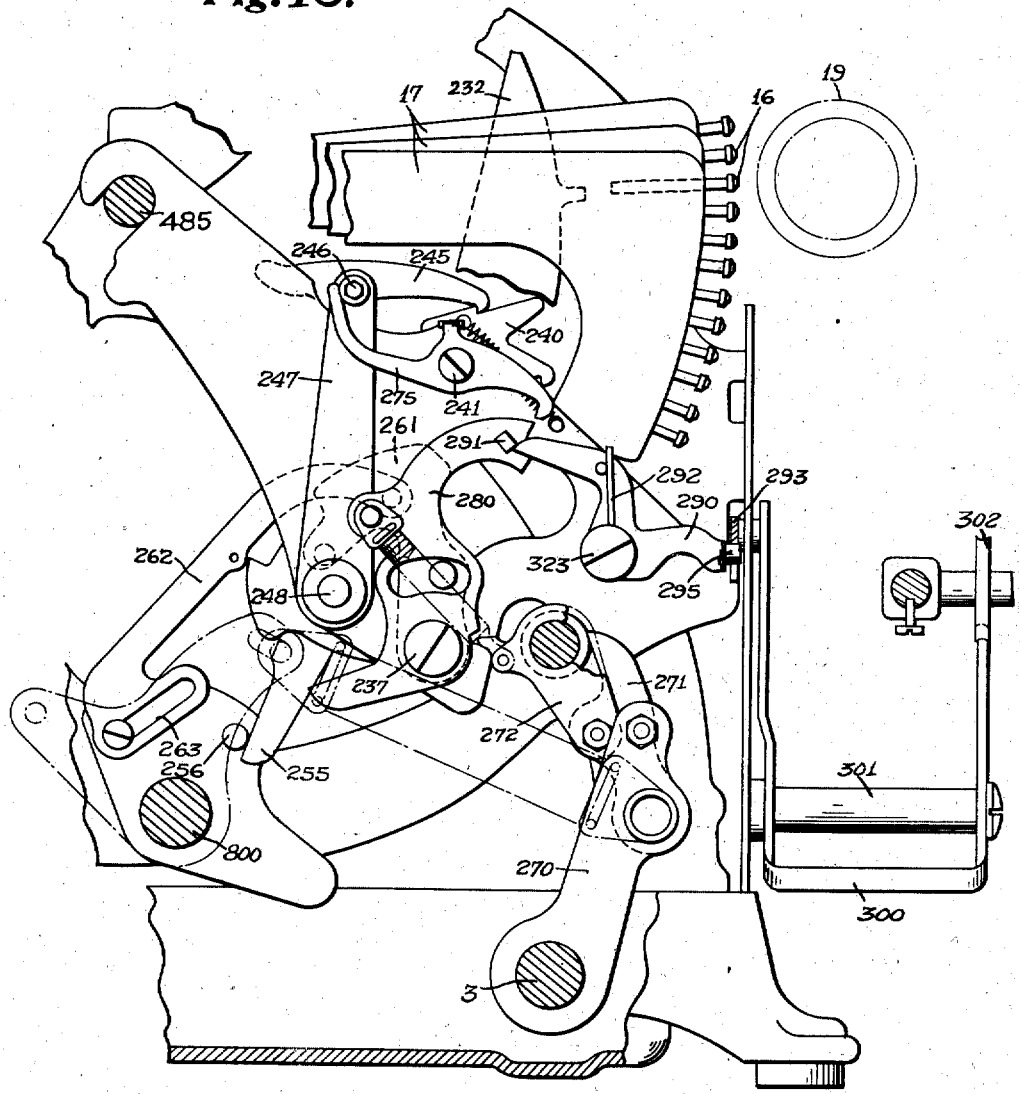

Fig. 15 is a partial right side elevation of the rear of the machine showing the control of the printing mechanism in the modified form of the invention.

Fig. 16 is a partial left side elevation of the rear of the machine showing the modified form of the invention applied to the machine.

Fig. 17 is a partial detail of a part of the mechanism for selectively controlling the printing mechanism.

The invention is shown applied to a Burroughs calculating machine of the "High keyboard" type but it will be understood that it may be applied to other types of machines as well. This machine will be illustrated and described in a general way only because it is already well known, not only from the many machines on the market, but also from the numerous patents that have issued covering it.

GENERAL FEATURES OF THE MACHINE

Figure 2:
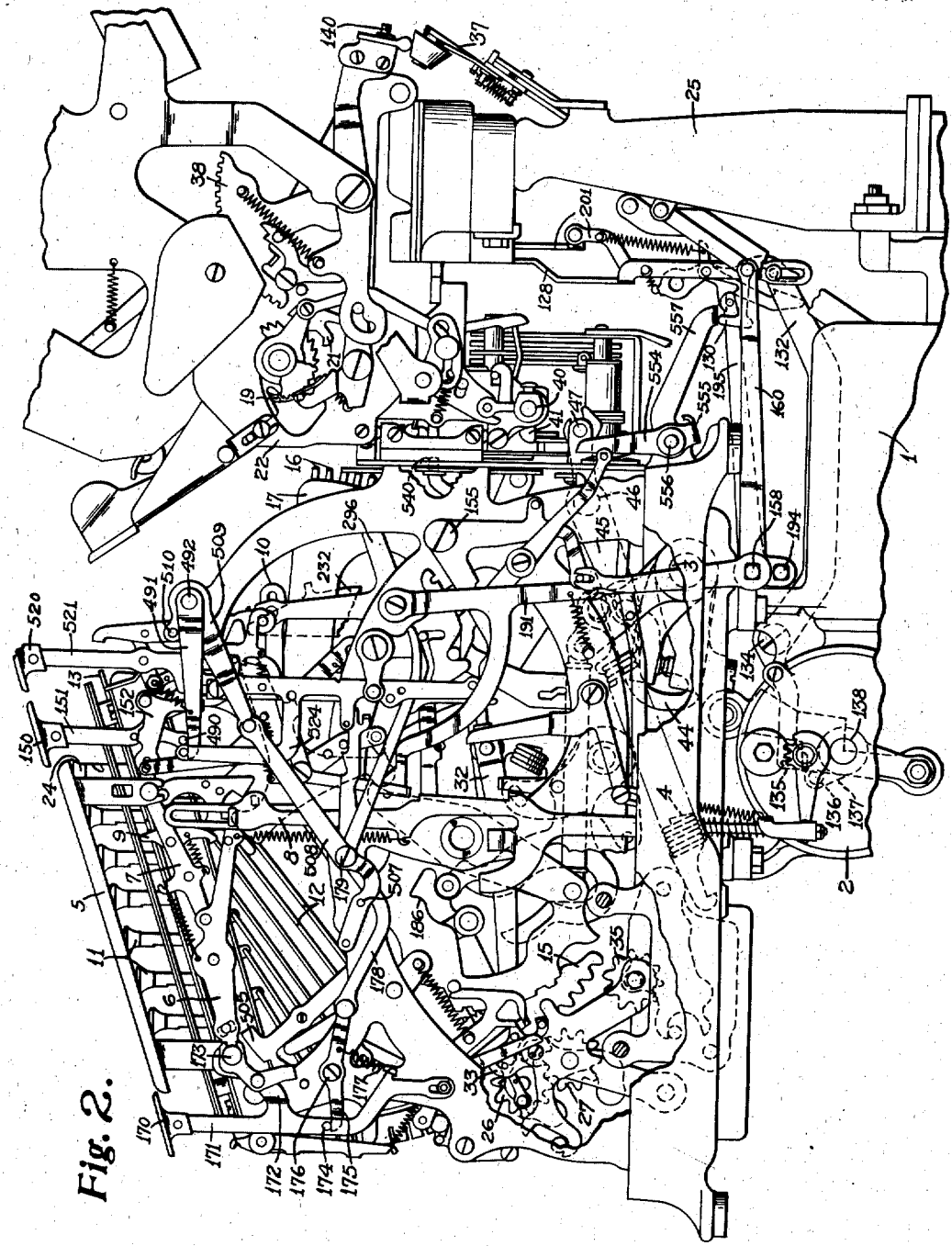
Fig. 2 is a right side elevation of the machine with the invention applied thereto, the parts being shown in normal position.

The machine, which is illustrated generally in Figure 2, is of a type which, after it is properly conditioned, is given a cycle of operation during which its various functions are performed. It may be cycled manually by means of a hand crank, but most of the present-day machines are provided with a power operated driving means that is actuated by an electric motor 1. This motor drives the machine through a normally disengaged clutch in the housing 2, which clutch is connected through the necessary cranks to the main drive shaft 3 that, in turn, is suitably connected to other parts of the machine to operate them. During the first half cycle the motor drive actuates the machine against the tension of several relatively strong springs 4 and this portion of the cycle is sometimes called the "forward stroke" of the machine. The springs 4 act to operate the machine to return the parts during the second half cycle, sometimes called the "return stroke." The connections between the clutch 2 and shaft 3 are such that the last half of the revolution of the clutch 2 may be completed before the springs 4 return the shaft 3 to normal, but the clutch is, in any case, disengaged at the end of a single full revolution. The parts normally move through the complete cycle in an uninterrupted manner.

The motor and clutch are normally controlled by a motor bar 5 which, when depressed, starts the motor and engages the clutch to cause said motor to give the machine a single cycle of operation. Depression of the motor bar rocks a lever 6 counterclockwise and a lever 7 clockwise to raise a link 8 that controls the clutch and switch. The motor control parts are latched in position by a latch 9 but normally are released during the second half of the machine cycle. The motor and its controls are described in detail in Vincent Patent No. 866,750, where, however, the motor is shown as a continuously running motor. Such a motor may be used but present-day machines usually employ a normally inactive motor whose circuit is closed by depression of the motor bar as shown in Bindschedler Patents Nos. 1,658,036 and 1,773,164. Repeat machine cycles are obtained under the control of a repeat slide 10 (Fig. 2) by mechanism such as shown in Muller No. 1,397,774. The power drive is often controlled from keys as well as from the motor bar, which keys may also condition other portions of the machine. Such keys are referred to as "live" keys because, when depressed to condition the machine for a certain function, they also cause the motor to give the machine a cycle of operation. Such a "live" key is illustrated in Muller No. 1,843,648 where a special "withdrawal" key that conditions the machine for subtraction also causes the machine to be given a cycle of operation. The total key is a live key in the machine illustrated, as will be later explained.

Figure 4:
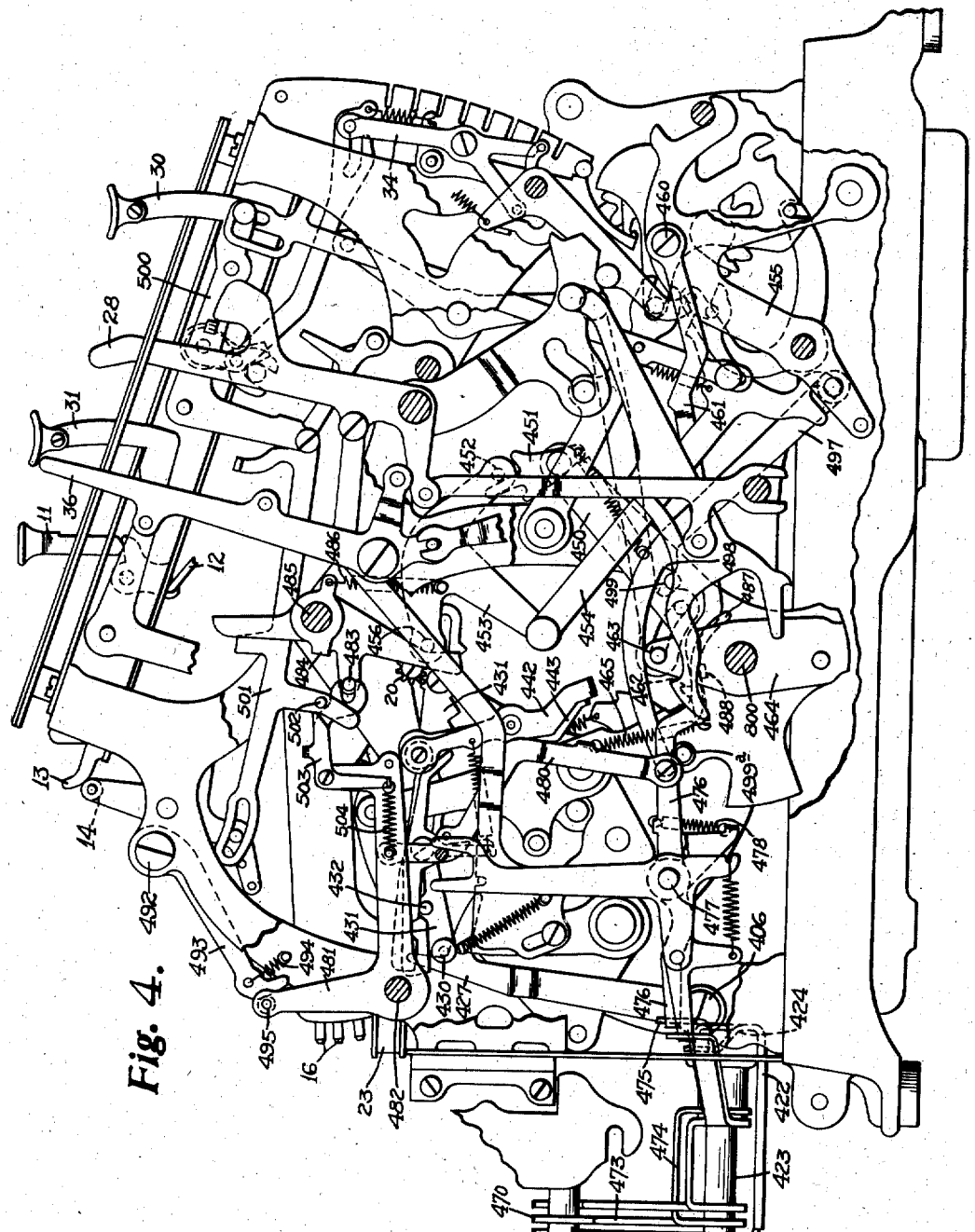
Fig. 4 is a left side elevation of the machine with the invention applied thereto, some of the parts being omitted to illustrate others more clearly.

An amount indexing means is provided for enabling "items" or "amounts" to be entered in the machine. This indexing means comprises a plurality of depressible amount keys 11 of which there are usually from nine rows to seventeen rows of nine keys each. When one of these keys is depressed, it sets, or indexes, its index stop 12 for arresting the actuator of its bank, or order, in a differential position corresponding to the digital value of the key depressed. The depressed keys are latched depressed during a machine cycle by latch plates 13 and they are normally operated to release the keys near the end of the cycle by a key restoring means of which the restoring bail is shown at 14 (Fig. 4). However, the keys may be retained depressed for repeat machine cycles as disclosed in Lundgren 1,033,109 and Rinsche 1,120,746.

The amount differential mechanism comprises a plurality of actuators 15 which, as the machine is cycled, are released by a bail (not shown) that is a part of the general operating mechanism; said actuators descending to differential positions determined by the amount keys depressed. This occurs during the first half cycle, said actuators normally being restored to normal by said bail during the second half cycle. These actuators and associated parts are sometimes referred to as an "amount determining differential mechanism" or "amount determining differential devices," which terms may include the amount indexing devices.

A printing mechanism is provided for printing the amounts entered in the machine as well as the totals. The type 16 (Fig. 2) of said printing mechanism are carried by the rearward ends of the levers 17 carrying the actuators 15, the type thus being differentially positioned or indexed at the time the actuators are positioned. At an appropriate time during the machine cycle, generally near the end of the first half of the cycle, a hammer mechanism to be described later, is operated to drive the type against record material held about a platen 19. After being operated, the printing mechanism is normally restored to non-indexed position as the levers 17 are restored during the latter half of the machine cycle. This printing mechanism is described in detail in Burroughs Patent No. 505,078. Said printing mechanism may be split, as described in Gooch No. 825,205 and Putnam 1,018,371, and certain sections or portions of it, or all of it, may be held inactive for printing purposes by a printing control or "hammer block" mechanism described in Gascon No. 1,395,991 and Muller No. 1,843,648, the controlling cam shaft 20 being shown in Fig. 4. The printing mechanism may also be controlled so as to print symbols to the left as disclosed in Bentzel 1,958,464. And certain portions of it may be used to print dates as described in Wing 1,351,082; or to print characters indicating the nature of the calculation, called printing "result characters," as disclosed in White 1,018,285; or to print special characters corresponding to special keys bearing characters indicating special items such as "months," in said Wing patent, or customers' account numbers, or items such as "oil" or merchandise, "Mds." Such printing is known as "special character printing".

The platen 19 about which the record material is held is automatically line spaced at appropriate times by a line spacing mechanism such as described in Kreis 913,738, Vincent 929,056 and Rinsche 1,580,534, portions of said mechanism being shown at 21 in Fig. 2. Said mechanism will be described in more detail later.

Printing is also controlled so that it may occur in different columns on record material supported on the machine. For this purpose a columnar-printing control means is provided which is in the form of a traveling paper carriage 22 together with means for moving and controlling the movement of said carriage. The carriage 22 carries the record supporting platen 19 and said carriage is urged across the machine to the left, viewing the machine from the front, usually called the tabulating direction, by a spring contained in the drum 23 (Fig. 4), and it is controlled in said movement by a tabulating mechanism such as disclosed in Vincent No. 929,056, and which later will be described in more detail. Normally, near the end of each machine cycle, the carriage moves from one columnar position to another. This movement may be from one column to the column immediately adjacent or it may be to some other column, the control being selectively variable, as described, for example, in Rinsche No. 1,580,534 or Muller No. 1,942,216. When it is desired that the paper carriage remains stationary, the tabulating mechanism may be disabled by a "carriage normal" key 24 such as shown in Kilpatrick No. 1,152,517 and in Muller No. 1,397,774, which, when depressed, usually enables the line spacing mechanism at the time the tabulating mechanism is disabled. This "carriage normal" key is often made a "live" key in which event it is called a "vertical spacing bar." Such a bar is shown in Muller No. 1,787,489. When depressed, it causes a cycle of machine operation, disables the tabulating mechanism and, ordinarily, enables the line spacing mechanism. The vertical spacing bars of the present case are described later.

The carriage is returned across the machine by a power operated carriage return mechanism designated generally as 25 in Fig. 2. Said mechanism is disclosed in Rinsche No. 1,580,534. It may be set into operation automatically as described in said patent or by means of a carriage return key. This carriage return mechanism later will be described in detail.

The tabulating and carriage return mechanisms jointly constitute a means for moving and controlling the movement of the record material support in two directions. The present invention requires that a relative movement occur between the record material and the printing mechanism and the embodiment of the invention disclosed herein shows the record material support as the movable part. But it is to be understood that the invention is not limited to a specific type of construction for obtaining said relative movement. The terms "movable record material support," or paper carriage, will hereinafter be used for convenience but are intended to be broad terms including all equivalent constructions for obtaining relative movement between the record material and the printing mechanism.

A main registering or "balance" mechanism capable of addition and the accumulation of positive totals, as well as subtraction and the accumulation of negative totals, is provided. This mechanism is sometimes called a totalizing mechanism, and, in the trade, is referred to as the "crossfooter." It is of the "tumbling" type and it comprises two sets or lines of pinions, namely, a set of add pinions 26 intermeshing with a set of subtract pinions 27. The machine is normally conditioned for amount entering, in which operation items are added or subtracted, and, in these operations, the registering mechanism is normally out of engagement with the actuators while they descend to differential positions but, before the actuators start on their return movement, said registering mechanism is engaged with them to thereby receive the entered item either additively or subtractively.

The machine is normally conditioned for addition, in which event the add pinions engage the actuators during their ascent. Said machine may be conditioned for subtraction, either manually or automatically, as described in Rinsche No. 1,172,484, Pasinski No. 1,778,506 and Pasinski No. 1,911,768, in which event the subtract pinions engage the actuators during their ascent. A manually operated subtract lever 28 is shown in Fig. 4.

A tens-transfer mechanism is associated with said registering mechanism, said tens-transfer mechanism being of the type employing an extra step of movement of the actuator and being capable of effecting both "carries" and "borrows" as described in Rinsche No. 1,172,484.

Total-taking control means is provided for conditioning the machine so that, when operated, a total will be taken, during which operation said total is normally printed. This control means usually includes and is governed by a total key 30 and by a subtotal key 31. When the total key 30 is used, the registering mechanism remains in engagement with the actuators during their descent, the differential positions of the actuators being determined by said registering mechanism. The registering mechanism is then disengaged while it is clear and remains disengaged during the ascent of said actuators. When the subtotal key 31 is employed the registering mechanism remains in engagement with the actuators during both their descent and ascent, so that the total, after being taken, is returned to said registering mechanism. Spacing cycles were necessary for total taking in early machines, one cycle to make sure that the machine was in add condition and another to restore tripped tens-transfer pawls, but no spacing cycle is now necessary except to "tumble" the cross-footer to the position corresponding to the algebraic sign of the total if it is not already in that position when the total is to be taken, the machine being equipped with the mechanism of Muller Patent No. 1,844,070, portions of which are shown at 32 in Fig. 2.

Negative totals may be taken directly as described in Rinsche Patent No. 1,172,484, which also describes the "fugitive 1" mechanism, a portion of which is shown at 33 in Fig. 2. When the position of the cross-footer and the position of the lever 28 do not agree with the algebraic sign of the total in the cross-footer, the total key is locked by a negative total lock mechanism described in Pasinski No. 1,778,506, and a portion of which is shown at 34 (Fig. 4). After correctly positioning the lever 28 or giving the machine a spacing stroke to "tumble" the cross-footer, or both when required, the total key may be depressed and the true negative total taken directly from the subtract pinions. No spacing strokes are required except for "tumbling" the cross-footer when the position of the latter does not correspond to the algebraic sign of the total in the cross-footer when the total is to be taken.

A plurality of multiple registers 35 (Fig. 2) are also provided, such being shown and described in Pasinski Patent No. 1,911,768. These registers may be selected automatically, as described in said Pasinski patent, or they may be selected manually from the keyboard, as described in Pasinski No. 1,909,715. Said multiple registers have a tens-transfer mechanism associated with them of the type disclosed in Pasinski No. 1,774,289. Totals and subtotals may be taken under the control of the total lever 36 (Fig. 4) as described in Pasinski No. 1,778,506. Totals, either positive or negative, may be transferred from the main registering mechanism to any selected multiple register as described in Pasinski No. 1,911,768, and totals in any selected multiple register may be transferred positively or negatively to the main registering mechanism.

The functions performed by the machine during machine cycles, including repeat machine cycles, carriage movement and the control of the printing mechanism, may be governed automatically, and this is done by controlling the condition of the machine in accordance with the condition of a member that normally moves as an incident to each machine cycle. The traveling paper carriage is employed for this purpose because it normally moves near the end of each machine cycle and thus affords an easy and convenient means for governing the machine functions. Such automatic controls are illustrated and described in more detail in Muller No. 1,397,774 and Rinsche No. 1,580,534 and in others of the patents that have been referred to. Certain of such controls will be explained in more detail later.

The paper carriage is provided with a front-feed means, portions of which are shown in Fig. 2, that enables work sheets to be front fed with respect to the platen. The platen is made so that it can be thrown from a printing to a throw-back or front-feed position and vice versa, provision being made for automatically opening and closing the front-feed throat by a power mechanism 37 (Fig. 2), as described in German Patent No. 647,638.

An ejecting mechanism 38 is associated with said front-feed means as described in Muller No. 2,110,399.

It is to be understood that the present invention is applicable to the Burroughs machine in its various forms.

EXAMPLES OF WORK

The mechanism will be more easily understood after first having an understanding of typical examples of work that may be performed. Three such examples will be explained.

*Example No. 1*

The first example is a simple one onvolving only a single line of entries in which a customer is billed only for the electricity used by him. This example is illustrated by the top line of entries in Fig. 1.

With the paper carriage in its No. 1 columnar position, the operator enters the date, "May 15;" the present meter reading "888;" and the previous meter reading, "555." He then gives the machine a cycle of operation by depressing the regular motor bar during which cycle the entered items are printed in column 1 as indicated. The machine is split into three sections so that the date, the present meter reading, and the previous meter reading are printed in spaced relation by the several sections of the machine. The date keys are usually latched down for the entire day's run so the operator never enters the date more than once for the day, said date being automatically printed for subsequent entries.

The operator then enters the amount of electricity used, "333," and the net amount due, "$4.50." The item "333" is usually precalculated by the meter reader and appears in his book, from which the operator makes the entry. The amount due is already precalculated according to a rate schedule. These two items must appear in four different places on the form, namely on the "customer's bill" and on each of the three stubs. As previously mentioned, multiple printing operations occur while a relative lateral movement takes place between the printing mechanism and the bill, said lateral movement being accomplished in the present embodiment of the invention by lateral movement of the paper carriage. This requires that the paper carriage move through columns 2, 3 and 4 to column 5. If the carriage is moved to its column 5 position, it must be returned to its column 1 position in order to start on the next bill. Consequently, insofar as timing is concerned, it is immaterial whether the multiple printing of the items occurs while the carriage is moving from column 1 to column 5 or while it is returning from column 5 to column 1, the two movements being necessary in any event. In the present embodiment it is preferred to have the multiple printing occur while the carriage is returning from column 5 to column 1 because, during such return, the carriage is moved directly by the power of the electric motor and there is ample force available to operate such mechanisms as it may be necessary to operate.

Accordingly, in the present machine no tab stops are provided in columns 2, 3 and 4, with the result that when the carriage is released near the end of the machine cycle in column 1 it moves in tabulating direction through columns 2, 3 and 4 to column 5. Thus, the entry of the amount of current used, "333," and the net amount due, "$4.50," previously referred to, is made with the carriage in column 5, the date keys having already been set. The operator then gives the machine a cycle of operation during which said entry is printed in column 5 and the invention comes into play to cause the return of the carriage to column 1 during which return the entry consisting of the items "333" and "$4.50," and the date where desired, will be printed in columns 4, 3 and 2 and the machine will complete its cycle with the carriage moving into the No. 1 column. The bill is automatically ejected in column 1 and the machine is in condition for the next bill.

The movement of the carriage in these operations requires very little time because the carriage does not hesitate or stop in columns 2, 3 or 4 while it is moving from column 1 to column 5 or from column 5 to column 1. The printing that occurs during the return of the carriage occurs while the carriage moves, the printing mechanism operating so rapidly that clear impressions are obtained without blurring and without requiring any hesitation in the movement of said carriage.

*Example No. 2*

Quite a good many customers use both gas and electricity, which means that there must be two lines of entries like that above described, one for gas and one for electricity.

The first line of entries is made as above described but, when the carriage returns to its No. 1 column, the bill must not be ejected. Instead, it should simply be line spaced. Accordingly, provision is made so that, if the operator depresses an auxiliary motor bar with the carriage in column 5, said carriage will return to its column 1 position and multiple printing will occur as above described but, when the carriage arrives in column 1, the front-feed throat will not be opened, the sheet will remain in the machine, and said sheet will be line spaced.

This particular example of work has not been illustrated in Fig. 1 as it simply involves another line of entries similar to the first line illustrated.

*Example No. 3*

In Example No. 3 the customer's bill contains a line of entries such as the top line in Fig. 1, but to this there must be added a charge of $1.25 for an item purchased, such, for example, as a piece of merchandise.

The first line of entries is started as above explained and the paper carrier moves to its No. 5 column. Here the operator again enters the amount of current used, "333," and the net amount due, "$4.50," but, because of the nature of the second item of $1.25, he depresses a special motor bar. During the ensuing cycle, the carriage returns through columns 4, 3 and 2 and prints the items in each column but, instead of moving into column 1 and stopping, the carriage moves only a short distance beyond column 2 and then returns automatically to column 5. The operator then enters the amount of $1.25 and depresses the special motor bar again during which a cycle occurs in which the $1.25 is added to the $4.50 that was first entered and the carriage travels through columns 4, 3 and 2, in each of which $1.25 is printed, slightly past column 2, and then returns automatically to column 5 again. Here the operator depresses the total key and, in the ensuing cycle, the carriage moves through columns 4, 3 and 2, in each of which columns the total "$5.75" is printed along with the amount of electricity consumed, "333," and the date, the carriage then moving into the No. 1 column where the sheet is ejected and the machine is in condition to receive the next bill.

It is to be understood that the above are merely typical examples and that many variations in the exact manner in which the machine is used are made to suit the customer's requirements.

CARRIAGE MOVING MEANS AND CONTROL THEREOF

Provision is made for moving the carriage 22 back and forth across the machine, and in the embodiment of the invention disclosed said carriage is moved in one direction by a spring in the drum 23 (Fig. 4), the movement in this direction being under the control of the tabulating mechanism. The carriage is moved in the other direction by an electric motor though the medium of the "carriage return mechanism" 25 (Fig. 2).

*Tabulating mechanism*

The tabulating mechanism is of the type disclosed in Rinsche 1,580,534 and other Burroughs patents for which reason it will be described only briefly. Referring to Figs. 2 and 5, the paper carriage supports a rockable tab bar 40, carrying a plurality of readily adjustable tab stops 41. These tab stops are positioned to engage an abutment 42 (Fig. 8), mounted on a stationary back plate 43 of the machine. At an appropriate time during the machine cycle, usually during the latter half thereof, the tab bar 40 is momentarily rocked to raise the active tab stop 41 above the abutment 42, whereupon the carriage spring moves the carriage laterally, said carriage being arrested in its next position by the next tab stop, the tab bar having been released in time to permit the succeeding tab stop to become active. The tab bar is rocked by mechanism, as follows:

Referring to Fig. 2, the main machine shaft 3, which is first rocked clockwise and then returned counterclockwise during a machine cycle, has a crank arm 44 fixed to it so as to rock with it. This crank arm has a cam slot in it in which a roller stud on the end of a lever 45 operates, said lever being pivoted at 46 and having a pin and fork connection 47 at its rear with a lug 48 (Fig. 8) on a slide 50 mounted to move up and down on studs 51 on the back plate 43. The slide 50 has a tabulating pawl 52 pivoted to it at 53 and urged counterclockwise by a spring 54, as shown in Fig. 8. During the first half of a machine cycle, the lever 45 (Fig. 2) is rocked clockwise and the slide 50 (Fig. 8) is moved downwardly, whereupon the pawl 52 moves down until it reaches a position where its spring 54 moves it under the active tab stop 41 so that, when said slide 50 is moved upward during the latter half of the cycle, the pawl 52 will engage said tab stop and rock the tab bar 40 and stop 41 to raise said stop above the abutment 42 (Fig. 8). The carriage immediately moves to its next position, the tab stop moving away from the tab pawl and the tab bar returning to normal so as to make the next tab stop active to arrest the carriage.

The slide 50 also operates the line spacing mechanism 21 for the platen 19. Slidably mounted on the studs 51 is a second slide 60 which, normally, is not connected to the slide 50. The slide 60 has two sets of projections 61 and 62 on its upper end which straddle a line spacing bail 63. The slide 60 may be connected to the slide 50 by a connecting pawl 64 pivoted at 65 to the slide 50 and urged counterclockwise by a spring 66. If said pawl 64 is moved clockwise from the position of Fig. 8, a projection 67 on it enters a notch 68 in the slide 60, and this serves to connect the two slides 50 and 60 together. When this occurs, and when the slide 50 is moved downward at the beginning of a machine cycle, the lugs 61—62 on the slide 60 rock the line spacing bail 63 downward and then, during the latter half of the machine cycle, rock it upward again to operate the line spacing parts 21 to line space the platen.

In the example of work shown in Fig. 1, when the machine is given a cycle of operation with the carriage in its No. 1 column, the tabulating mechanism is operated during the latter half of the cycle, whereupon the carriage moves through columns 2, 3 and 4 to column 5. In other words, there is no tab stop for columns 2, 3 and 4, and the carriage is not arrested in any of these columnar positions.

*Carriage return mechanism*

The carriage return mechanism is also disclosed in said Rinsche Patent No. 1,580,534. It is driven by the electric motor 1 operating through mechanism contained in the housing to which the numeral 25 is applied in Fig. 2. This mechanism drives the gear 70 (Fig. 6) to which the gear 71 maybe clutched by a clutch mechanism 72, the gear 71 being in mesh with a rack 71ª on the paper carriage (Figs. 5 and 6). The clutch 72 is controlled by a clutch control lever 73 pivoted at 74 to a stationary plate 75 fixed to the housing 25. The carriage return mechanism illustrated herein is that of said Rinsche patent with refinements that have been made since the date of said patent. The normal construction of the carriage return will be described first and the changes for the present invention then explained.

As stated, the carriage return clutch 72 is controlled by a control lever 73 pivoted at 74, said lever being releasably held in either of two positions by a spring-urged detent 76 having a stud 77 engaging notches in a projection on the control lever 73. Said control lever 73 is controlled automatically by the paper carriage or it may be governed by a carriage return key on the keyboard.

The automatic control by the carriage is effected by means of an irregular shaped slide 80, shown in Figs. 6 and 9, mounted to have a limited sliding movement on stud 81 on the stationary plate 75. In the normal position of the parts as viewed in Fig. 6, the slide 80 is in its rightmost position and the control lever 73 is in its counterclockwise position. Fig. 9 illustrates these parts in their opposite positions.

In the usual construction of this carriage return, the automatic control is as follows: During the latter half of a machine cycle with the carriage in a columnar position from which it is to be returned, the carriage is released by the tabulating mechanism and it moves slightly to the left as viewed from the front or to the right in Fig. 5. As the carriage moves, a stop on the carriage, such as the stop 82 shown at the left of Fig. 5, engages the end of the slide 80 and moves it to the right as viewed in Figs. 5 and 9.

The slide 80 carries a member 84 (Fig. 9) pivoted to it at 85 and urged clockwise in Fig. 9 by a fairly strong spring 86. When the slide 80 is in its normal position to the right (Fig. 6), the upper edge of the member 84 is under a stud 87 on the stationary plate 75, said stud blocking the member 84 against counterclockwise movement (Fig. 6). When the slide 80 is moved to the left, as viewed in Fig. 6, to its Fig. 9 position by the slight movement of the carriage as explained above, the pivoted member 84 moves with it, with the result that a notch 88 in the upper edge of the member 84 comes into register with the stud 87. The member 84 is thereupon rocked clockwise as viewed in Fig. 9 by its spring 86 and the abutment end 89 of said member engages a stud 90 on the control lever 73 to rock said lever counterclockwise (Fig. 9) to thereby engage the clutch of the carriage return mechanism. Said mechanism then returns the carriage to the column where it is to be stopped. Provision is made for causing the motor to continue to operate as long as the carriage return mechanism is engaged.

As the carriage approaches the position where it is to be stopped, a carriage control member 100 (Fig. 5) on the carriage disengages the clutch and restores the parts to normal. This member 100 has a projection 101 which engages the end 102 (Fig. 9) of the member 84. The member 84 is first rocked counterclockwise in Fig. 9 to carry the notch 88 away from stud 87, after which the pressure on said member 84 moves the slide 80 to the left in Fig. 9 to thereby restore said slide to normal and also to move the upper edge of the member 84 under the stud 87. At about the same time a cam projection 103 (Fig. 5) on the carriage control member 100 engages and cams downwardly a stud 217 on the control lever 73 and thus rocks said lever clockwise in Fig. 9 to disengage the carriage return clutch.

A manual control is provided in the form of a carriage return key 110 (Fig. 3) which is urged upward by a spring 111. The lower end of the stem of this key is connected to one arm of a bell crank 112 pivoted to the machine at 113. The other arm of the bell crank 112 is pivotally connected to an arm of a second bell crank lever 114 pivoted on the shaft 556. The other arm of bell crank 114 is connected to a link 128 that governs the carriage return. When the key 110 is depressed, the link 128 is moved downward to set the carriage return into operation as will be explained presently.

Referring to Fig. 9, the stud 90 on control lever 73 has positioned astride it the forked end of a link 91 connected at its lower end to one arm of a bell crank 92 pivoted at 93. A spring 94 also connects the stud 90 with the bell crank 92. The other arm of the bell crank has a stud and slot connection 95 with a switch arm 96 pivoted at 93. The switch arm 96 carries a pair of switch contacts 97 adapted to contact the contacts 98 to open and close the motor circuit 99. When the control lever 73 is in its position where the carriage return clutch is disengaged, which is a clockwise position from that shown in Fig. 9, the motor switch is open. However, when the control lever 73 is moved counterclockwise, as viewed in Fig. 9, to close the carriage return clutch, said lever 73, acting through the link 91 and spring 94, closes the motor switch and keeps it closed as long as the lever 73 is in clutch engaging position. Thus, the motor continues to run until the carriage reaches a position where the carriage return mechanism is disabled, whereupon the control lever 73 will be moved to disengage the clutch and open the motor switch.

The above carriage return mechanism has been modified in the present invention to get certain new results and to operate in combination with the other portions of the invention to obtain the multiple printing results hereinafter explained.

Referring to Fig. 6, the carriage stop 82, instead of engaging the end of the slide 80 as it normally does to set the carriage return mechanism into operation, is arranged to engage the end of a secondary slide 120 to set the carriage return in a given column but not to cause it to operate. The slide 120 is mounted for a limited movement on studs 121 on the slide 80 and urged to the right as viewed in Fig. 6 by a spring 122. This secondary slide has a lug 121ª formed with a slot in which is positioned a stud 123ᵇ on one arm of a bell crank 123 pivoted at 124 on a projecting portion 125 of the slide 80. The other arm of this bell crank 123 has a lateral lug 123ª adapted to be engaged by one arm of a bell crank 126 pivoted to the stationary plate 75 at 127, the other arm of said bell crank 126 being pivotally connected to the upper end of a link 128. The link 128 is urged upward and the bell crank is urged clockwise against a limit stud on the plate 75 by means of a spring 129.

Referring to Fig. 7, the link 128 has pivoted to it a hooked pawl 130 normally engaging under a stud 131 on the end of a lever 132, the pawl 130 being urged to its normal position by a spring 133. The lever 132 is illustrated in Fig. 2 and, as there shown, is pivoted at 134 to a stationary portion of the machine. The forward end of the lever has a nose 135 positioned in the path of a stud 136 on a crank 137 fixed to the clutch shaft 138. This shaft is given a rotation every time the motor is operated to give the machine a cycle. It will be recalled that, in the Burroughs machine, when the motor bar is depressed the motor drive operates to actuate the machine through the first half of its cycle, after which the motor drive moves away from the main operating means which is returned to normal by the springs 4 (Fig. 2).

The normal position of the parts 132—137 is shown in Fig. 2. When the machine is given a cycle of operation the shaft 138 rotates counterclockwise for a revolution and near the end of this revolution the stud 136 engages the nose 135 and rocks the lever 132 clockwise. This moves the stud 131 (Fig. 7) downwardly and said stud, acting on pawl 130, moves the link 128 downward.

In the examples of work shown, when the carriage moves into its column 5 position, which is the column from which the carriage is to be returned, the carriage stop 82 engages the end of the secondary slide 120 and moves it to the left in Fig. 6. This rocks the bell crank 123 counterclockwise and positions the lug 123ª in front of the arm of the bell crank 126. When the motor is energized with the carriage in column 5 to give the machine a cycle of operation, the shaft 138 (Fig. 2) rotates. The parts are timed so that, after the printing mechanism has operated, the lever 132 (Fig. 2) is rocked clockwise which pulls the link 128 downward, rocks the bell crank 126 (Fig. 6) counterclockwise, and said bell crank, acting on bell crank 123 pivoted to slide 80, moves said slide to the left in Fig. 6. This movement of slide 80 engages the carriage return clutch as heretofore explained, whereupon the motor returns the carriage toward its column 1 position where the clutch is disengaged by the carriage control cam 103, as also explained.

Although the link 128 is moved down during each machine cycle, it does not set the carriage return mechanism into operation except in selected carriage positions where the stop 82 moves the secondary slide 120 to position the lug 123ª in front of the arm of the bell crank 126.

There are several other features of the return mechanism which act during the above operation but these can be described more clearly after the different controls for the carriage return mechanism are described. These several controls will be separately described.

Control of carriage movement when regular motor bar is depressed

When only a single line of entries is to be made, as, for example, the top line in the example illustrated in Fig. 1, the operator makes the necessary entries with the carriage in column 1 and then depresses the regular motor bar whereupon the machine is given a cycle during the latter part of which the carriage moves in tabulating direction from the No. 1 to the No. 5 column. He then makes the necessary entries in column 5 and, ordinarily, depresses the regular motor bar whereupon a machine cycle is started during which the entry is printed in column 5 and the carriage returns to column 1, multiple prints being made in columns 4, 3 and 2, as will be presently explained.

When the regular motor bar 5 is depressed in column 5, a machine cycle is started and the printing mechanism operates. After printing has occurred, the link 128 is moved downwardly whereupon the carriage return mechanism is set into operation, the secondary slide 120 having been set by the carriage stop 82 in the column 5 position. The carriage returns across the machine till it reaches the No. 1 column where the cam member 103 (Fig. 5) disengages the clutch and restores the parts to normal as heretofore explained.

As the carriage moves into its No. 1 column a control stud 140 (Figs. 2 and 5) on a bail 141 on the carriage hits a pawl 142 on a latch which is thereby moved to release the power operated throat opening means 37 and the ejecting mechanism 38 to open the front feed throat and eject the bill.

There is a further phase of the control of the carriage return mechanism when the regular motor bar is used but a description of it will be deferred until further types of controls have been explained.

Control of carriage movement when auxiliary "motor bar" is depressed

As heretofore explained, it sometimes happens that a bill must be made out with two single lines of entries such as the first line in the examples of Fig. 1. For example, a customer may use both gas and electricity, in which event one line covers entries for electricity and a second line the entries for gas. In that event, after the carriage reaches column 5 in the first line of entries, and after making the entries in column 5, the operator depresses a motor bar 150 (Fig. 2) which, for purposes of convenience, will be called the "auxiliary" motor bar. Depression of the motor bar 150 causes the same type of operation as when the regular motor bar 5 is depressed except that, when the carriage reaches its No. 1 column, the front-feed throat is not opened and the sheet is not ejected.

Referring to Fig. 2, the auxiliary motor bar 150 has a stem 151 carrying a bell crank 152, one arm of which is connected to the lever 7 forming a part of the main motor bar mechanism. The arrangement is such that, when the auxiliary motor bar 150 is depressed, the main motor bar 5 will be carried down with it and latched in depressed position by the usual main motor bar latch and the auxiliary motor bar will be held down as long as the main motor bar is latched in depressed position, but manual depression of the main motor bar will not carry down the auxiliary motor bar. This interconnection of an auxiliary and a main motor bar is a familiar type of connection on the Burroughs machine and has been disclosed in numerous prior patents.

The stem 151 of the auxiliary motor bar extends downwardly and its lower end (Fig. 3) carries a stud 153 positioned over one arm 154 of a bell crank pivoted at 155. The other arm 156 of this bell crank has a stud and slot connection with an arm 157 fixed to a shaft 158 that extends toward the center of the machine and which carries on its other end an arm 160 (Figs. 2 and 3) extending toward the rear of the machine. The rearward end of the arm 160 is connected to a slide 161 whose upper abutment end 162 (Fig. 5) is positioned under a stud 163 on the pawl 142 that controls the throat opening and ejecting mechanisms disclosed in Müller 2,110,399.

When the auxiliary motor bar 150 is depressed, the slide 161 (Fig. 5) is moved downwardly which allows the pawl 142 to move clockwise under the urge of its spring (not shown) so that it will not be engaged by the stud 140 on the paper carriage as the paper carriage moves into its No. 1 columnar position. Accordingly, when the carriage reaches the column 1 position, after depression of auxiliary motor bar 150, the front-feed throat will not be opened and the sheet will not be ejected. Instead, the sheet will remain in the machine to receive the second entry.

The platen is line spaced during the completion of the cycle in column 1 as follows: Referring to Fig. 8, it will be recalled that the line spacing slide 60 is normally disconnected from the slide 50 but may be connected thereto by the member 64. Pivoted on the back plate 43 at 165 is a yoke 166 having one arm formed as a cam nose 167 and the other arm having a spring held pawl 168 pivoted to it. When the carriage moves into column 5, an extra long carriage tab stop 41, such as shown in dotted lines in Fig. 8ª, engages the cam nose 167 and rocks the bail 166 clockwise (Fig. 8) which causes pawl 168 to rock member 64 to connect the slide 60 to the slide 50. During the first portion of the cycle in column 5 the two slides are pulled down which pulls the line space pawl of the line spacing mechanism 21 (Fig. 2) to operating position. The slides 50 and 60 are not moved upward until the carriage reaches its column 1 position where the machine cycle is completed. When said slides are moved upward in column 1, the platen is line spaced. This occurs every time the machine is operated in column 5, the platen being line spaced no matter whether the carriage stops in column 1 or returns to column 5.

The second line of entries in the two-line example is made in the same manner as the first but in the column 5 position of the carriage the operator depresses the regular motor bar 5 and during the ensuing cycle the carriage returns to its column 1 position, where the sheet with the two entries on it is ejected.

Control of carriage movement when "special" motor bar is depressed

When different lines of entries are to be made on the bill, as in Example 3, it is desired that, after the entries are made with the carriage in the column 5 position, said carriage move through columns 4, 3 and 2, where the entries will be printed and then return immediately to column 5. When this type of operation is desired, the operator depresses the motor bar 170 which, for purposes of convenience, will be called the "special" motor bar.

The "special" motor bar 170 (Fig. 2) has a stem 171 having lateral projection 172 positioned above a stud 173 on one of the stems of the main motor bar 5 so that, when the "special" motor bar is depressed, the main motor bar will go down with it and a machine cycle will be started, but depression of the main motor bar will not carry down the "special" bar.

The stem 171 of the "special" motor bar carries a stud 174 (Figs. 1 and 3) overlying one end of a lever 175 pivoted at 176 to the machine frame and urged clockwise by a spring 177. The other end of this lever is pivotally connected to one end of a lever 178 (Fig. 3) pivoted at 179. Near its other end the lever 178 has a shoulder 180 normally positioned in front of a stud 181 on a lever 182 pivoted at 183 and urged clockwise by a spring 184. The lever 182 is normally held against clockwise movement by the three-arm member 185 which is a standard part of the Burroughs machine. This three-arm member normally occupies the position shown in Fig. 3, being spring urged clockwise but prevented from moving by the full stroke sector 186. As the machine is given a cycle of operation, the full stroke sector 186 moves counterclockwise, whereupon the three-arm member 185 is released and it moves clockwise, the parts being restored to normal during the latter half of the machine cycle. Thus, it will be apparent that during the first half of a machine cycle the lever 182 will move clockwise unless prevented from doing so by the shoulder 180 on lever 178 engaging the stud 181 on the lever 182.

When the "special" motor bar is depressed, the lever 178 is rocked clockwise to remove the shoulder 180 from the path of stud 181 and, consequently, during cycles of machine operation initiated by depression of the "special" motor bar 170, the lever 182 will first rock clockwise and then be restored counterclockwise.

The lower end of the lever 182 carries a stud 187 adapted to engage a cam end 188 on a long extension 190 of a lever 191 pivoted at 192 to the machine frame. The lower end of lever 191 has a stud and fork connection with an arm 193 pivoted loosely on shaft 158 and fixed to a rod 194 that extends toward the left side of the machine. Also pivoted loosely on shaft 158 and fixed to the rod 194 is a rearwardly extending lever 195 carrying a relatively long stud 196 (Fig. 7) which extends over the tail of the pawl 130 and under the tail of a pawl 200 pivoted on a link 201 and urged counterclockwise by a spring 202. When the lever 182 (Fig. 3) is rocked clockwise at the beginning of a machine cycle, the lever 191 is rocked counterclockwise and arm 195 is rocked downward. As the arm 195 moves downward, its stud 196 rocks the pawl 130 (Fig. 7) counterclockwise to a disabled position and releases the pawl 200 to permit said pawl to be rocked counterclockwise by its spring 202 to move the shoulder on pawl 200 under the stud 131 on the lever 132.

It will be recalled that, during each operation on the machine, the lever 132 with its stud 131 is rocked downward and then restored upward; also that, normally, when the stud 131 moves downward, it carries the pawl 130 with it and moves the link 128 downward which sets the carriage return mechanism into operation, provided it has been preconditioned as explained for the column 5 position of the carriage. But, when the "special" motor bar 170 is depressed, and the pawl 130 is disabled, the link 128 will not be moved downward and, hence, control of the carriage return mechanism by said link is disabled. However, the carriage return mechanism is set into operation under these conditions by the link 201 which moves downward with the stud 131.

Referring to Fig. 6, the link 201 is slidably mounted on a stud 213 on the stationary plate 75. Pivoted to said link at 203 is a pawl 204 having a lateral lug 205 on its upper end, said pawl being urged counterclockwise, as viewed in Fig. 6, by a spring 206. Pivoted on the stud 81 on the back plate 75 is a member 211 having a shoulder 212 adapted to be engaged by the lateral lug 205 of the pawl 204, but, in a normal position of the parts with the carriage return disconnected, to occupy the position shown in Fig. 6. Pivoted on the stud 213 is a pawl 214 and pivoted to this pawl at 215 is a connecting link 216 having a notched upper end straddling a stud 217 on the control lever 73 for the carriage return mechanism. The connecting link 216 is urged clockwise about its pivot 215 by a spring 218, said link being limited in its movement by the engagement of its upper end against the stud 217. The tension of spring 218 not only tends to rock the connecting link 216 clockwise but it also tends to rock the pawl 214 clockwise about its pivot 213, but movement of pawl 214 normally is limited by engagement of a lateral lug 219 of said pawl against a shoulder on the member 211, as shown in Fig. 6.

Assume that the parts are in the normal position of Fig. 6 and that a machine cycle is initiated by depression of the "special" motor bar 170. As the shaft 138 (Fig. 2) is given a revolution, the lever 132 will be rocked clockwise, the stud 131 (Fig. 7) will move down, and the link 201 will be moved downward, and then returned upward by spring 206. As said link 201 moves downward, the lug 205 on pawl 204 will move below the shoulder 212, whereupon the spring 206 will rock the pawl under said shoulder. As the link 201 returns upwardly, the pawl 204 engaging shoulder 212 will rock the member 211 counterclockwise about its pivot 81. This will move the shoulder on said member away from the lug 219 on the pawl 214, whereupon the spring 218 will pull the pawl 214 about its pivot 213 and thrust the link 216 upward to rock the control lever 73 clockwise (Fig. 6) to set the carriage return mechanism into operation. Also, as the pawl 214 rocks clockwise (Fig. 6) its upwardly extending finger moves against the lug 205 of the pawl 204 and disengages the latter from the shoulder 212 of the member 211 so that member 211 will be freed to enable it to reengage the lug 219 of pawl 214 when the latter is returned to normal, as later will be described.

Accordingly, when a machine cycle is initiated by depression of the "special" motor bar 170, the carriage return mechanism will be set into operation during the cycle to return the carriage from its No. 5 position toward its No. 1 column. Said mechanism will be set into operation by wholly different means than when the regular motor bar is depressed, the regular motor bar control mechanism being disabled by reason of the fact that depression of the special motor bar disabled pawl 130 (Fig. 7).

As the carriage returns through its Nos. 4, 3 and 2 positions, the indexed item will be printed and then, just as the carriage moves slightly beyond its No. 2 position, the carriage return mechanism will be controlled so that the carriage will be released, whereupon it will be returned to its No. 5 columnar position by the spring that moves the carriage in tabulating direction, there being no tabulating stops in the Nos. 2, 3 and 4 columns.

As the carriage moves slightly out of its No. 2 columnar position toward its No. 1 position, a carriage roll 220 shown in Figs. 1 and 5 engages a stud 221 (Fig. 6) on a lever 222 pivoted at 127. The lever 222 has a slot in which the stud 215 is positioned. When the carriage roll 220 depresses the stud 221, the lever 222 is rocked counterclockwise (Fig. 6), whereupon the link 216 is pulled downward and the control lever 73 is rocked counterclockwise to disable the carriage return mechanism and free the carriage for return to column 5. As link 216 moves downward, the pawl 214 rocks counterclockwise about its pivot 213 and the shoulder on member 211 moves over the lug 219, the member 211 being urged clockwise by a spring 223 (Fig. 6). The control mechanism for the carriage return is thus restored to normal.

In the description of the control of the carriage return mechanism when a cycle is initiated by the regular motor bar, reference was made to certain features that would be later described. These can now be made clear. When the carriage return mechanism is controlled by an operation initiated by the regular motor bar, the control slide 80 is moved to the left (Fig. 6) and the member 84 (Fig. 9) is released, whereupon it moves upward to set the carriage return into operation. However, if some means were not provided to prevent it, the link 216 (Fig. 6), which is astride stud 217 on control lever 73, might prevent movement of said control lever. As the slide 80 is moved to the left during a machine cycle initiated by the main motor bar 5 or the auxiliary motor bar 150 while the carriage is in its column 5 position as above explained, a downwardly projecting lug 224 on it engages a stud 225 on the link 216 and rocks said link counterclockwise about its pivot 215 to disconnect the notched upper end of said link 216 from the stud 217 on control lever 73. In other words, the control mechanism that is conditioned by the "special" motor bar 170 is disabled and parts of it are moved to such a position that it will not interfere with the operation of the control mechanism governed by the "regular" and auxiliary motor bars 5 and 150.

From the above it should be clear that, when a machine cycle is initiated by depressing the "special" motor bar 170 in column 5, the carriage conditioned means for controlling the return mechanism is disabled, and another mechanism is conditioned to set the carriage return into operation during the machine cycle. This second control for the carriage return has a release means associated with it so that, when the carriage moves out of column 2 toward column 1, the carriage return will be disabled and the carriage freed, whereupon the carriage will return to column 5, there being no tab stop in columns 2, 3 and 4. As the carriage is not returned as far as its column 1 position in a machine cycle initiated by depression of the special motor bar 170, the throat-opening and ejecting mechanisms are not operated in such a machine cycle.

*Control of carriage movement when total key is depressed*

When the operator is performing work, such as the example of Fig. 1, he depresses the "special" motor bar 170 with the paper carriage in column 5 prior to printing the entries in columns 2, 3 and 4 of the first line, after which the carriage is returned through columns 4, 3 and 2 where printing occurs in the first line on the form, after which the carriage moves back to column 5. Here the operator makes a second entry, such as $1.25, and again depresses the "special" motor bar 170, whereupon the carriage is returned again through columns 4, 3 and 2 where printing occurs in the second line, and, again, the carriage moves back to column 5. The operator now desires to take the total after which the carriage should be moved through columns 4, 3 and 2 where the printing should occur, but the carriage should move on to column 1 and the front-feed throat should be opened and the bill ejected so that the machine is ready for the making out of a new bill.

When the total key 30 is depressed with the carriage in its No. 5 column, and assuming a positive total in the registering mechanism, the machine is conditioned for total taking and a machine cycle is initiated, as described in Muller 1,844,070. In so far as the control of the carriage is concerned, the parts operate in the same manner described for depression of the regular motor bar. In other words, the carriage return mechanism is set into operation by the downward movement of the link 128 (Figs. 3 and 7) and the carriage returns through its Nos. 4, 3 and 2 columns in each of which the total is printed, after which said carriage moves to its No. 1 column where the throat is opened and the bill ejected.

MULTIPLE PRINTING

As previously stated, the present invention provides for printing an item a multiplicity of times during a machine cycle and while the carriage is moving through a plurality of columns in which printing is desired. For an understanding of this portion of the invention, a brief review of the Burroughs printing mechanism will be of assistance.

The printing mechanism is of the type disclosed in Burroughs Patent No. 505,078 and other subsequent patents, as well as in thousands of machines on the market. It comprises a plurality of orders but, for simplification and clearness, only one order will be described.

Referring to Figs. 10, 11 and 12, a series of movable type 16 are carried on the rear end of the levers 17 whose front ends carry the actuators. The type are differentially positioned in front of the platen in accordance with the differential positions of the actuators. Said type are spring urged to retracted position by springs 230 (Fig. 11).

Pivoted on the stationary shaft 323 (Fig. 12) fixed on the frame of the machine is a printing hammer 232 having a nose 233 adapted to strike the end of the type that is in printing position. The movements of this hammer are controlled by a firing member 234 carrying a stud 235 operating in a cam slot 236 in the hammer 232. The firing member is pivoted loosely on a shaft 237 journaled in the machine frame, and said firing member is urged clockwise in Fig. 12 by a spring 238, this being the direction in which the firing member is moved to drive the hammer against the type. Normally the firing member 234 is held against movement by a latch 240 pivoted on a stationary shaft 241, said latch being provided with a hooked end 243 engaging over the pointed end of the firing member 234. At an appropriate time during a machine cycle, the latch 240 is released, whereupon the spring 238 quickly moves the firing member 234, and its stud 235, acting in the cam slot 236, drives the printing hammer 232 rearward to hit the type. The shape of the cam slot 236 is such that the stud 235 positively drives the hammer 232 toward its printing position but the end of said slot is slightly enlarged, as shown in Fig. 11, and the momentum of the hammer is depended upon to drive the type to its final position. This enlarged end of the slot enables the hammer to move back slightly which it does by gravity owing to the location of its pivot and also because the spring 230 for the type immediately retracts the type from printing position and carries the hammer with it. Thus, while the type is quickly driven to printing position with a percussive action, it is instantly retracted slightly so as to be free of the paper, which action is provided to prevent blurring.

The latch 240 is released by a pawl 245 pivoted on a shaft 246 carried by a pair of arms 247 (Fig. 11) fixed to a shaft 248 that is rockably mounted in the frame of the machine. The pawl 245 is urged clockwise (Fig. 11) by the spring 238 and it is provided with a hooked nose 250 adapted to engage a shoulder 251 (Fig. 10) on the latch 240. In the normal position of the parts shown in Fig. 10, the hooked nose 250 of the pawl 245 is slightly forward of the shoulder 251. The front end of the pawl 245 has a cam nose 252 which is positioned to engage a cam edge 253 on the underside of the arm 17 in its order under certain conditions.

The shaft 246 carrying the pawls 245 for all orders is rocked forward by an arm 255 (Fig. 11) that is fixed to the shaft 248 that carries the arms 247 supporting the shaft 246. The arm 255 is positioned in the path of a stud 256 on a member 257 (Fig. 10) fixed to the 800 shaft of the machine. During the first half of the machine cycle, the 800 shaft is rocked clockwise in Fig. 10 and is then returned counterclockwise. Near the end of the first half of the cycle, the stud 256 engages the arm 255 and rocks the shaft 248 counterclockwise to move the shaft 246 forward to carry all the pawls 245 forward against the tension of a spring 242 (Fig. 11) connected to one of the arms 247.

When the shaft 246 carrying the pawls 245 is rocked forward, or to the left in Fig. 10, the noses 252 of the pawls 245 in orders in which the levers 17 have not been moved above the "0" position engage the cam edges 253 of said levers and the pawls are rocked about the shaft 246 to move their hooked ends 250 upward so that as said pawls move forward, they will not trip their latches 240. Thus, in orders where the levers 17 are not moved above "0" position, no printing will occur except as provision is made for printing ciphers to the right of significant digits. But, in orders where the levers 17 have been moved to significant digit positions, the cam edges 253 are raised above the path of the noses 252 of the pawls 245, as illustrated in Fig. 11, and, in said orders, as said pawls 245 are moved rearward, they will not be rocked and their hooked noses will engage their respective latches 240 to release them and thus release the firing members 234.

The printing mechanism is restored to normal by restoring bail 260 (Fig. 12) carried by a pair of arms 261, one of which is shown in Fig. 12, fixed to the shaft 237. Pivoted to the left-hand one of the arms 261, as shown in Figs. 10 and 15 is a link 262 having a stud and slot connection 263 with the rock plate 257 fixed to the 800 shaft.

When the parts are in the normal position of Fig. 10, the stud on rock plate 257 occupies the bottom of the slot 263 in the link 262 and the restoring bail 260 is in engagement with the tails of the firing members 234 as in Fig. 12, said restoring bail aiding in holding said firing members in normal position. During the first half of the machine cycle, the 800 shaft rocks clockwise in Fig. 10 and the stud on rock plate 257 moves toward the top of the slot 263. But the link 262 does not move upward until the firing members 234 have been released by the release of their latches 240. Near the end of the first half of the machine cycle, said firing members 234 are released, whereupon they move clockwise in Fig. 12 and carry the restoring bail 260 with them. The link 262 (Fig. 10) is then moved upward until the stud on rock plate 257 engages the bottom of the slot 263. During the second half of the cycle, when the 800 shaft is rocked counterclockwise, said stud, engaging the bottom of slot 263, pulls the link 262 downward and said link restores the bail 260 to normal, said bail in turn restoring the firing members 234 to normal against the tension of their springs 238. During this second half cycle, the arm 255 (Fig. 11) on shaft 248 is also released by stud 256 and the shaft 246 carrying the pawls 245 restores to normal under the urge of the spring 242 (Fig. 11). At the same time, the latches 240 are freed for return to normal.

Provision is made for printing ciphers to the right by having the latches 240 (Fig. 12) provided with overlapping tails 264. The printing mechanism may be split in various ways, as described in many prior patents; for example, Muller No. 1,843,648.

The printing mechanism so far described is the familiar Burroughs construction. The changes and additions involved in the present invention will now be described.

The machine is provided with a toggle lock for certain portions of the general operating means. Referring to Fig. 10, there is fixed to the main shaft 3 a crank arm 270. Pivoted to this crank arm is one link 271 of a toggle whose second link 272 is pivoted to the first and to a stationary shaft 273 mounted in the frame of the machine. When the machine is in normal condition, the toggle 271—272 is broken, as illustrated in Fig. 10. At the end of the half cycle, the toggle is moved to the position of Fig. 11, after which it will prevent the return or counterclockwise movement to normal of crank arm 270 and shaft 3 unless the toggle is broken. It is preferable that there should be substantial looseness in the toggle so that the crank arm 270 may return counterclockwise from its Fig. 11 position through a very small distance sufficient to insure that the mid-point of the toggle can swing slightly over center to lock the parts. In Fig. 11 this has been represented in exaggerated form by showing the opening formed in the member 271 to receive the stud on the member 272 as an elongated slot. It will be recalled that the shaft 3 is first rocked clockwise by the motor drive and then released at the end of the half cycle so that it may be returned by the springs 4 (Fig. 2). These springs actuate the main portions of the machine during the second half of the cycle.

It will be recalled that, near the end of the first half of the cycle, the stud 256 (Fig. 11) on the rock plate 257 on the 800 shaft engages the arm 255 to rock the arms 247 carrying the shaft 246 forwardly. Positioned in the path of this shaft 246 (Fig. 12) is the tail of a pawl 275 pivoted on shaft 241 and urged clockwise (Fig. 12) by a spring 277. This pawl has a hooked nose 278 normally engaging over the pointed end 279 of a member 280 pivoted on the shaft 237 and urged clockwise by a spring 282. The arrangement is such that, when the shaft 246 is moved forward near the end of the first half cycle, it engages the tail of pawl 275 and rocks said pawl to release the member 280 which is thereupon moved clockwise by its spring 282. The parts are so proportioned that the pawl 275 releases the member 280 very shortly after the firing members 234 have been released and have operated the printing hammers and have moved the bail 260 upwardly and rearwardly.

The member 280 has a shoulder 283 positioned to strike the projecting end of the link 272 of the toggle 271—272. When the member 280 is moved clockwise by its spring 282, the shoulder 283 strikes the link 272 and breaks the toggle lock rearward to release it. This toggle acts as a safety device to prevent return of the general operating means until after the printing mechanism has operated because the release of the toggle depends upon the forward movement of the shaft 246 that releases the printing latches.

In the present invention, the above toggle is employed to momentarily block operation of certain parts of the machine during the machine cycle while other parts continue to operate, to wit, the printing mechanism, motor drive and carriage moving means, to thereby obtain a multiplicity of prints, after which locked portions are released to finish their operation as the machine completes its cycle. Release of the toggle is controlled by means of a blocking lever 290

(Fig. 12) pivoted on shaft 323 and having an abutment end adapted to engage a stud 291 on the member 280 that normally is moved clockwise by its spring 282 when released by the printing mechanism near the end of the first half of the machine cycle. The blocking lever 290 is urged counterclockwise (Fig. 12) by a spring 292 and it is controlled by a slide 293 governed by the paper carriage, said slide having a slot 294 (Fig. 12) that may be brought into register with a stud 295 on the blocking lever 290. In the embodiment of the invention shown, the control slide 293 is a part of the mechanism that controls the automatic repeat machine cycles, which mechanism is disclosed in detail in Muller 1,397,774 and 2,012,317. Repeat machine cycles are governed by the repeat slide 10 (Fig. 2), which is moved by the bell crank 296, and the latter, in turn, is moved by the slide 293 (Fig. 8) as described in said Muller Patent 1,397,774. The slide 293 is connected to a stud 297 (Fig. 8) on one arm 299 of a bail 300 pivoted at 301 to the back plate 43. The other arm of this bail (Fig. 5) is a cam arm positioned in the path of a carriage roll 302 (Fig. 5). The arrangement is such that, when the repeat mechanism is in normal position, the slide 293 is in a position such that its notch 294 is in register with the stud 295 on the end of the blocking lever 290, with the result that the blocking lever will be held counterclockwise by its spring 292 in a blocking position. This is the condition of the parts when the carriage is in column 5.

Accordingly, when a machine cycle is initiated in column 5, the toggle 271—272 will be blocked at the end of the half cycle of shaft 3 and crank arm 270 even though the printing mechanism operates. It will be recalled that, during the machine cycle initiated in column 5, the carriage return mechanism is set into operation and this occurs by power of the motor notwithstanding disengagement of the clutch 2 and irrespective of whether or not the shaft 3 completes its operation. Thus, the motor continues to run even though shaft 3 does not complete its cycle and the carriage returns through its 4, 3 and 2 columnar positions. As the carriage moves out of its No. 2 columnar position toward column No. 1, the control roll 302 (Fig. 2) moves the slide 293 to move the notch 294 (Fig. 8) out of register with the stud 295 and thereby cams the blocking lever 290 out of active position, whereupon the member 280 (Fig. 12) is released and it is rocked clockwise by its spring 282 to strike lever 272 and release the toggle. This control by the roll 302 releases the toggle when, after the printing of the entry in the second column in either the first or the second line of entries in Fig. 1, the carriage returns to its No. 5 columnar position. As the carriage moves from its No. 2 toward its No. 1 columnar position just before its return to column 5, the roll 302 becomes active to release the toggle so that the blocked portions of the machine can complete their operation while the carriage is returning to column 5.

The same action occurs when the carriage moves to column 1 from column 2 as after the printing of the entry in column 2 in the third line of Fig. 1, the toggle being released slightly before the carriage reaches column 1. Another release roll 303 (Figs. 1 and 5) is provided in column 1 to prevent the toggle being locked during the cycle of the machine initiated in column 1 at the start of making out a bill.

The use of the slide 293 of the repeat mechanism for controlling the blocking lever 290 does not interfere with the use of said slide for controlling repeat machine cycles. When said slide 293 is to be controlled by the carriage so as to govern the blocking lever 290 only, a small control roll such as 302 or 303 shown in Fig. 5 is employed which moves the slide a shorter distance than the normal large roll that is employed to control repeat machine cycles. The small roll moves the slide 293 far enough to govern the blocking lever 290 but not far enough to operate the repeat mechanism. When a large roll is used to condition the repeat mechanism, slide 293 is also moved far enough to disable the blocking lever 290. In fact the machine with the present invention embodied in it may be set to automatically operate through a number of repeat machine cycles between what are now columns 1 and 2 so that, after entries are made in column 1, the machine can go through a number of repeat machine cycles and then, after the last of these cycles, the carriage can move to column 5. In that event, large control rolls are used on the carriage to set the repeat mechanism above explained to cause the automatic machine cycles. The blocking lever 290 will not be active during these repeat machine cycles because the large control rolls will move the slide 293 beyond a position where the slot 294 will register with the stud 295 on the blocking lever.

With the mechanism so far described, assume that a cycle of machine operation is initiated with the carriage in its No. 5 column. The machine will start as usual, the printing mechanism will operate, and after it is operated the carriage return mechanism will be set into operation, but the shaft 3 will be momentarily blocked. Nevertheless the motor will continue to operate and the carriage will be returned through columns 4, 3 and 2. It is during this movement of the carriage that the printing mechanism is repeatedly operated without arresting the carriage to obtain an imprint in each of the columns through which the carriage moves. It has been found that the printing action is so rapid and that the type are retracted so quickly from the paper that clear, non-blurred imprints are obtained. The mechanism for causing these multiple prints will now be described.

Referring to Fig. 10, the motor shaft 138 carries a four-pointed cam 310, this cam being mounted on said motor shaft on the driving side of the clutch so that the cam will be operated while the motor is operating during the carriage return and irrespective of the condition of the clutch 2 that drives the shaft 3. Positioned for engagement with the cam 310 is a roller stud 311 carried on the end of an arm 312 fixed to a shaft 313 journaled on the frame supporting the motor. Also fixed to the shaft 313 is an arm 314 that is connected by a link 315 to an arm 316 pivoted on the shaft 237 and urged clockwise (Fig. 10) by a spring 317. The parts just described are normally held in inactive position with the roller stud 311 out of the path of the points on the cam 310 by means of a projection 320 (Figs. 10, 11 and 12) on an arm 321 which is in the path of a stud 322 on the arm 316. The arm 321 is pivoted on a stationary shaft 323 and urged counterclockwise by a spring 324. If, however, the arm 321 with its projection 320 is moved away from the stud 322, the spring 317 moves arm 316 and lowers the arm 312 to move the stud 311 into the path of the cam points on cam 310, with the result that the parts just described will be very rapidly oscillated, this oscillation occurring four times during each revolution of the shaft 138. The release of this mechanism is accomplished as follows:

The arm 321 (Fig. 12) carrying the projection 320 also has an upper laterally and forwardly projecting portion 325, 326 (Fig. 12) having a cam face positioned in the path of a stud 327 on the member 280. It will be remembered that the member 280 is pivoted on shaft 237 and urged clockwise by spring 282. Also that said member is released from the latch 275 very shortly after the printing mechanism has operated, the release being accomplished by the forward movement of the shaft 246 which engages the tail of the latch 275 (Fig. 12) and, somewhat after said shaft 246 has operated the pawls 245, moves the latch 275 to release the member 280 which moves to release the toggle heretofore described. If the release of the toggle is not prevented, the member 280 moves its full distance whereas, if release of the toggle is blocked, the member 280 moves only a short distance until stud 291 engages the end of blocking lever 290, the distance being indicated in Fig. 10. In both cases the stud 327 on the member 280 engages the cam face of the arm 326 and rocks the bail 325 clockwise sufficiently to move the blocking projection 320 out of the path of the stud 322 to release the parts that are oscillated by the motor.

When the printing mechanism operates, the restoring bail 260 (Fig. 12) moves upwardly and rearwardly and the arms 261 carrying said bail move clockwise with the shaft 237. Fixed to one of the arms 261 (Fig. 12) is a shaft 330 extending to the left in Fig. 12 where it is connected to a lever 331 also fixed to the shaft 237. The arms 261 and the lever 331 thus move as a unit.

Mounted on a stud 332 on the upper end of the lever 331 is a disk-like member 333 (Fig. 12) and a bell-crank pawl 334, these parts being best shown in separated perspective in Fig. 13. The pawl 334 has a rearwardly projecting portion having an abutment face 335 normally positioned out of the path of a stud 336 (Fig. 12) on the oscillatable arm 316. However, said pawl may be positioned so that its abutment face 335 is in the path of said stud, in which event the stud will engage the pawl and rock the lever 331, thereby moving the restoring bail 260 as will presently appear. The pawl 334 is limited in its movement about stud 332 by two studs 337 and 338 on the lever 331 and it is provided with a spring 339 attached at one end to a stud on said pawl and at its other end to a stud 340 on the disk 333, the arrangement being such that the spring can be moved over the pivotal center 332 of the pawl as will presently appear. The disk 333 is limited in its movement about pivot 332 by studs 341 and 342 which engage the edge of the lever 331.

When the restoring bail 260 moves at the time the printing mechanism is fired, the arm 261 and lever 331 are moved clockwise (Fig. 12), and the disk 333 together with the pawl 334 move with the lever 331. During the later portion of such movement, the stud 340 on the disk 333 engages a shoulder 350 on an arm 351 pivoted on the shaft 323 (Fig. 12) and urged clockwise in engagement with the stud 340 by a spring 353. As the lever 331 completes its movement the disk 333 is rocked counterclockwise (Fig. 12), with the result that the spring 339 is moved past the pivotal center 332 of the pawl 334 so that the spring then rocks said pawl clockwise. This places the abutment end 335 of said pawl in the path of the stud 336 on the oscillatable arm 316. As said arm 316 moves counterclockwise during its oscillation, the stud 336 picks up pawl 334 and rocks the lever 331 counterclockwise, thereby rocking arm 261 counterclockwise, returning the restoring bail 260 to normal, and recocking the firing members 234. It is to be observed that, in this restoring operation, the pawls 245 controlling the latches 240 for the firing members 234 are not disturbed and that the latches 240 remain released in the orders in which printing should occur. This is because the toggle 271—272 blocks the immediate return of the shaft 3 and of the 800 shaft driven by it so that the stud 256 (Fig. 11) does not release arm 255, and the arms 247 supporting shaft 246 on which pawls 245 are mounted remain forward so that the pawls in the orders in which printing should occur hold their latches 240 released.

As the lever 331 (Fig. 12) is returned counterclockwise as above explained to restore the bail 260, said lever together with bail 260 is temporarily held in position by the engagement of a stud 354 on the lower end of the lever 331 behind a shoulder 355 on a lever 356 pivoted at 357 and urged clockwise (Fig. 12) by a spring 358. Thus the printing mechanism is temporarily held in recocked condition. The holding mechanism does not interfere with normal operations for reasons explained later.

As the lever 331 is returned counterclockwise, the stud 340 on the disk-like member 333 engages a forward shoulder 359 on the arm 351 which rocks the disk-like member 333 clockwise. This swings the spring 339 across the pivot 332 of the pawl 334 with the result that said spring rocks the pawl counterclockwise so that its abutment end 335 is out of the path of the stud 336 on the oscillating member 316.

In other words, when the printing mechanism is fired in column 5, it conditions an oscillating mechanism so that said oscillating mechanism will be oscillated by the motor which is controlled by the carriage return mechanism so that it will continue to run; and it conditions the connections between this oscillating mechanism and the printing mechanism so that the oscillating mechanism will recock the printing mechanism under the power of the motor and independently of the usual means employed for recocking said mechanism. The recocking occurs instantly after the printing operation has occurred in column 5 and before the paper carriage has had an opportunity to be moved a substantial distance by the carriage return mechanism. The printing mechanism is held recocked until released in the next column as will presently appear.

The lever 356 for temporarily holding the printing mechanism recocked does not interfere with normal operations for the following reasons. When the machine is in normal non-operated condition, the member 280 is held in the position shown in Fig. 10 by a link 366 connected to an arm 367 of the main restoring bail of the machine. In this position, a tail 365 on member 280 engages a stud 364 on lever 356 to hold said lever in its Fig. 10 position where the shoulder 355 is below the stud 354 on lever 331. As the machine is operated normally the link 366 releases member 280 at the beginning of a machine cycle, but the member 280 is not released until the shaft 246 moves forward far enough during the machine cycle to move the latch 275. The parts are timed so that the firing members 234 operate the printing hammers before the latch 275 is released, with the result that the restoring bail 260 (Fig. 12), the arms 261, and the lever 331 are moved to move the stud 354 on lever 331 beyond the shoulder 355 before lever 356 is released by a movement of member 280. This prevents the lever 356 from interfering with the normal operation of the printing mechanism. When the arm 367 of the main restoring bail returns to normal it returns member 280 to normal and moves lever 356 to inactive position.

When the member 280 is released from latch 275 during the operation in column 5 it moves until blocked by the blocking lever 290. The arm 367 of the main restoring bail is not restored to normal but remains in a position to free member 280. As member 280 moves, the lever 356 is moved by its spring 358, the stud 364 on lever 356 following the member 280, until the shoulder 355 is in the path of stud 354. Consequently, the lever 356 is active to hold the printing mechanism in recocked condition when it is recocked after the printing operation in column 5.

The printing mechanism is released by the carriage to print in column 4 by means of a control roll 360 (Figs. 1 and 5) which engages a cam arm 361 (Fig. 5). This arm is one arm of a bail pivoted at 301 and having another arm 363 provided with a bifurcated end engaging over the end of the latch 356 (Fig. 12). The control roll 360 is positioned so that, as the carriage moves into column 4, the printing mechanism is released at the proper time to make the printing impression in the desired place in said column. This printing occurs so quickly and rapidly and the type are so quickly retracted from the paper that a clear printing impression is obtained without requiring any hesitation in the movement of the carriage.

At the time the printing operation occurs in column 4, the oscillating mechanism, including the arm 316 (Fig. 12), is in motion because the member 280 is held in its Fig. 12 position by the blocking lever 290 so that its stud 327 maintains arm 326 and bail 325 in position to keep the projection 320 out of the path of the stud 322 on the oscillatable member 316. As the printing mechanism operates, the restoring bail 260 is moved upward and rearward, as heretofore described, which moves the arm 261 and lever 331 clockwise in Fig. 12. Again, the pawl 334 is swung to operating position and the oscillating arm 316 picks up said pawl and recocks the printing mechanism immediately, whereupon it is again temporarily held by lever 356 which, because member 280 remained in the position of Fig. 10, returned to latching position as soon as the control roll 360 passed the cam arm 361.

As the carriage moves through column 3, the printing mechanism is again released by a control roll 370 (Figs. 1 and 5) to print in the proper place in column 3, after which the printing mechanism is immediately and automatically recocked again by the oscillating mechanism driven by the motor, and again temporarily held.

As the carriage moves through column 2, the printing mechanism is again released, this time by a control roll 371 (Figs. 1 and 5), and again recocked and held. The number of columns in which the printing occurs can, of course, be varied to suit the requirements.

As the paper carriage moves out of its No. 2 columnar position toward its column 1 position, no matter whether it moves to column 1 or is returned to column 5, the release roll 302 becomes effective to move the slide 293 so as to move the blocking lever 290 to release the member 280 which thereupon moves its full distance and breaks the toggle 271—272, whereupon the springs 4 (Fig. 2) return the shaft 3 and associated parts to normal to finish the cycle of the calculating mechanism portion of the machine.

As the printing operation is completed in column 2, the printing mechanism is recocked and, if the carriage moves into column 1, said printing mechanism is not released because there is no carriage roll such as 360, 370 or 371 in said column for releasing it. If the carriage is returned through columns 2, 3 and 4 to column 5, the rolls 360, 370 and 371 in columns 2, 3 and 4 do not release the latch lever 356 that controls release of the cocked printing mechanism because the upper end of the control lever 361 (Fig. 5) is formed as a pass-by pawl which yields as the carriage returns from column 2 to column 5.

From the above it will be clear that a construction has been provided in which, during a single cycle of machine operation and without requiring repeated operations of the calculating mechanism and general operating means, a multiplicity of printing impressions in different columns on a work sheet can be obtained by a single printing mechanism. In the embodiment of the invention illustrated, four printing impressions are obtained, one being the normal print in column 5, but this number can be increased or decreased, if desired, depending upon the requirements of the work. The multiplicity of prints are made very quickly as it requires only a short time for the carriage to move through the columnar positions where the multiple prints are made. The printing impressions have been found to be very clear and they occur without blurring even though the travel of the carriage continues as the impressions are made. Wear and tear on the machine is decreased as compared with constructions where a complete cycle of the calculating mechanism and general operating means is required for every printing impression. The construction also has the important advantage that the multiple prints may be obtained with a calculating machine having a single printing mechanism and without requiring the building of a special machine with a multiplicity of printing devices and a multitude of complicated controls.

MODIFIED FORM OF MULTIPLE PRINTING MECHANISM

In the form of mechanism heretofore described the printing mechanism is operated by power direct from the motor but controlled by the carriage. This is the preferred form but a modified form has also been produced in which the parts are carriage actuated. While this places a load on the carriage the necessary power is available because the operations occur while the carriage is being returned under the direct power of the motor. This form of the invention is shown in Figs. 14 to 16, inclusive.

Referring to Fig. 14, the machine is provided with the toggle 271—272, and with the member 280 (Fig. 15) for releasing said toggle, as heretofore described. A blocking lever 290 (Fig. 15) is also provided for engaging the stud 291 on the member 280 to block the toggle, this blocking lever being controlled by the slide 293 having a notch adapted to register with the stud 295 on the lever. The slide 293 is controlled by the carriage control roll 302 which acts through the bail 300 (Fig. 15), as heretofore explained. Consequently, when a cycle of machine operation is initiated with the carriage in column 5, the toggle is blocked, the printing mechanism operates in said column, and the carriage return mechanism is set into operation as heretofore explained.

Referring to Fig. 16, the carriage is provided with a control roll 400 operating on one arm 401 of a bail 402, whose other arm 403 is connected to a projection 404 on a lever 405 pivoted at 406. The upper end of this lever carries a thrust bar 407 having a shoulder 408 adapted to engage a stud 409 on a crank 410 fixed to the shaft 237. The shaft 237 is the shaft to which the arms 261 are fixed that support the restoring bail 260.

When the printing mechanism is fired in column 5, the shaft 237 with its crank arm 410 rocks from the full line position of Fig. 16 to a position that puts the stud 409 in the dot-and-dash position of Fig. 16 where said stud is immediately in front of the shoulder 408 on the thrust bar 407. As the carriage returns from column 5 through column 4, the roll 400 rocks the bail 402 and moves the thrust bar forward from the full to the dot-dash position of Fig. 16 which rocks the crank 409 and shaft 237 clockwise, thereby returning the restoring bail 260 to normal and recocking the firing members 234 of the printing mechanism. The pawls 245 and latches 240 of the printing mechanism are not restored to normal for reasons heretofore explained.

The control roll 400 that operates the bail 402 that recocks the printing mechanism moves off the arm 401 of said bail so quickly that the effect in column 4 is to cock the printing mechanism and immediately release it. Accordingly, the hammers 234 are again fired by their springs to cause a printing impression in column 4, the control roll 400 being properly located to get the imprint at the desired location. Similar carriage rolls are provided for columns 3 and 2 and as many other columns as may be required. Thus, as the carriage passes through columns 4, 3 and 2, the printing mechanism is automatically cocked and released by the carriage with sufficient rapidity and accuracy to cause printing to occur in the respective columns as the carriage travels through them, the printing impression being clear and non-blurred because of the very rapid action. Then, as the carriage moves out of its column 2 position, either to column 1 or column 5, the toggle 271—272 is broken and the machine cycle completed, as in the embodiment proviously described.

SELECTIVE CONTROL OF PRINTING ELIMINATION

In the example shown in Fig. 1, the same items are printed in each column where the multiple prints occur except for column 2 where the date is omitted. It is desirable, at times, to eliminate one or more of the items in selected columns and, since the printing mechanism is split into three sections in the embodiment of the invention illustrated, any one or more of the three sections can be controlled to obtain this result.

Since the only printing elimination in the examples illustrated is that of the date in column 2, the description will be confined primarily to said elimination but it will be understood that, since the printing mechanism is split into three sections, the control may be varied to eliminate any one or more of the different items in selected columns.

Referring to Figs. 1, 4 and 5, the paper carriage is provided with a control roll 420 operating on the cam end of an arm 421 (Fig. 5) forming one end of a bail 422 pivoted at 423. The position of this control roll relative to column 2 is diagrammatically illustrated in Fig. 1. The other arm 424 of the bail has a notch engaging a short stud 425 (Fig. 16) of a bell crank pivoted at 406. The other arm 427 of this bell crank extends upward (Figs. 4 and 16) and said bell crank is urged clockwise by a spring 428 (Fig. 16). The upwardly extending arm 427 of the bell crank is yieldingly held in engagement with a stud 430 on a slide 431 by a spring 430ª connected at its front end to a stud on said slide 431. The slide 431 is geared to the hammer block cam shaft 20 that controls the latches 240 of the printing mechanism to disable said latches in predetermined orders depending upon the position of the slide 431, as disclosed in Muller 1,843,648.

In the present case, the slide 431 is provided with a stud 432 (Fig. 4) operating on the lower cam edges of two levers 433 and 434 (Fig. 16) pivoted at 435. These levers are urged counterclockwise (Fig. 16) by springs 436 and they have notches 437 and 438 in their lower edges as shown in Fig. 16. The forward ends of the levers 433 and 434 are provided with cam surfaces adapted to engage studs 440 and 441, respectively, on the levers 442 and 443 pivoted at 444. The lower ends of the levers 443 and 442 have a baillike formation as illustrated in Fig. 17. The bails on the lower ends of the levers are positioned so that they may be interposed in the paths of shoulders 445 (Fig. 16) on the firing members 234 of the printing mechanism. As shown in Fig. 17, the bail of lever 443 has a broad projection 446 for blocking the firing members in the three orders of the printing mechanism that print the date. The other bail is shown as operating to block all of the firing members of all orders to eliminate printing entirely, but this bail, as well as the other bail, can be notched to suit the requirements.

When a small control roll, such as the control roll 420 is employed, the arm 427 (Fig. 16) is rocked counterclockwise just far enough to cause stud 432 to register with the notch 438 in lever 434. When this occurs the spring 436 for lever 434 will rock said lever counterclockwise which will cam the lever 443 clockwise (Fig. 16) and move the projection 446 (Fig. 17) into the path of the shoulders 445 on the firing members 234 in the orders that print dates. This occurs when the paper carriage is in its No. 2 columnar position and at the time printing occurs in said column. When a larger control roll is used, the arm 427 (Fig. 16) is rocked counterclockwise far enough to cause stud 432 to register with the notch 437 in lever 433, the stud at that time holding lever 434 inactive. The lever 433 is then rocked counterclockwise by its spring 436 and the lever 442 cammed clockwise to move the bail on the lower end of lever 442 into the path of all the firing members 234.

The number and size of the control rolls such as control roll 400 can, of course, be varied, and they can be positioned in any required columns. Likewise, the notches and the bails on levers 442 and 443 can be varied to get different combinations of the control of printing elimination. Thus, when the multiple print occurs, it can be controlled to get printing of the desired items in the desired column. This printing elimination control operates in both forms of the invention disclosed, since it is not concerned with the particular mechanism for operating the printing mechanism but with the blocking of the firing members in the desired orders.

SELECTIVE CONTROL OF REGISTERING MECHANISM

As explained, the machine is provided with a main registering mechanism 26—27 (Fig. 2) and a plurality of multiple registers 35. These are selectively controlled by the paper carriage or by keys as disclosed in Pasinski patents, No. 1,911,768 and No. 1,909,715. While the selection of the registers for action in different columns may be varied over a wide range, a preferred control is employed with the examples of work illustrated which control will be explained by way of showing what can be done.

The Burroughs machine illustrated is normally in addition condition with respect to the main registering mechanism 26—27, and it is normally in non-add condition as regards the multiple register 35, that is, these multiple registers are normally inactive and must be selected if an amount is to be entered in them. Normally, the multiple registers are not used in the work with which the present invention is primarily concerned and their control will not be described. They can be selected and rendered active to receive the different amounts in connection with the making out of public utility bills if it is desired to accumulate certain items in particular registers, but in that event they would simply be rendered active in the usual way. The kind of work herein described is concerned chiefly with the use of the main registering mechanism and, in order that the control of this registering mechanism may be understood, the means for controlling it will be briefly reviewed.

Referring to Fig. 4, the 800 shaft has an arm 450 fixed to it carrying a pass-by pawl 451 on its end. This arm is first rocked counterclockwise and then returned clockwise during a machine cycle. As the arm rocks counterclockwise at the beginning of a cycle, the pass-by pawl 451 engages the stud 452 on one arm of a three-arm member 453 pivoted on the frame of the machine. This three-arm member 453 is connected by a link or pitman 454 to the rockable frame 455 carrying the main registering mechanism 26—27. The arrangement is such that, at the beginning of a machine cycle, the register frame is rocked to disengage the registering mechanism from the actuators. Near the end of the first half of the machine cycle, the pass-by pawl 451 passes another stud 456 on another arm of the three-arm member 453 and said pawl is then positioned to act on said stud 456 at the beginning of the second half of the machine cycle. Normally, at the beginning of said second half of the cycle, the pass-by pawl 451 engages the stud 456 and rocks the three-arm member 453 clockwise to rock the register frame 455 so as to engage the main registering mechanism with the actuators before they are moved upwardly toward normal. Thus, the machine is normally conditioned to perform addition.

There is a second means for moving the register frame 455. Pivoted to said frame 455 at 460 is a link 461 having a shoulder 462 formed on its rear end which shoulder may be positioned in the path of a stud 463 in the end of a lever 464 fixed to the 800 shaft. The rear end of the link 461 is urged upward by a spring 465. Normally, near the end of the first half of a machine cycle, the stud 463 engages the shoulder 462 and moves the link 461 rearwardly to rock the register frame 455 to engage the registering mechanism with the actuators, the timing being such that the engagement does not occur until after the actuators have been differentially positioned during the first half of the machine cycle. When the engagement of the register is caused by the link 461, the operation by the pass-by pawl 451 on the stud 456 in the three-arm member 453 is unnecessary as said three-arm member has already been moved, owing to the fact that the frame 455 has been rocked and said frame, acting through the link 454, has rocked the member 453. The two controls are provided for reasons that are not of particular importance here.

The control of the registering mechanism in connection with the present invention can be most easily explained in conection with an explanation of the several different ways in which the machine is operated under the control of different motor bars and the total key.

*Control of registering mechanism when regular motor bar is depressed*

In the first example of work, which involves making out a bill having only one line of entries, it is not ordinarily considered necessary to accumulate any of the items. However, a cycle of machine operation is initiated in both the No. 1 and the No. 5 columnar positions of the carriage and, since said machine is normally conditioned for addition, if no accumulation is desired, some provision must be made for non-adding the registering mechanism.

For the purpose of non-adding the main registering mechanism, a plurality of carriage control rolls 470, 471 and 472 (Figs. 1 and 5) are employed, said rolls being illustrated diagrammatically in Fig. 1 in the positions they occupy relative to the columns on the bill, the rolls being illustrated on the carriage in Fig. 5. Since the control of the non-add mechanism by these several rolls is the same for each, a description of the control by one will suffice for all.

Referring to Fig. 5, when the carriage is in its No. 1 column the roll 470 engages the cam edge of a lever 473 forming one arm of a yoke 474 pivoted at 423. The other arm 475 of this yoke has a slot engaging over the end of a lever 476, illustrated more particularly in Fig. 4. This lever is pivoted at 477 and urged clockwise by a spring not shown. The forward arm of the lever has a yielding connection with the main part of the lever through a spring 478 and said forward arm is connected to a link 480 whose upper end is connected to one arm of a bell crank 481 pivoted at 482. The forward arm of this bell crank has a slot engaging over a stud 483 on a lever 484 pivoted at 485 and urged clockwise by a spring 486. The lower end of the lever 484 is adapted to be positioned in the path of the pass-by pawl 451. The arrangement of such that when the carriage roll 470 engages the arm of the bail 474 it rocks the lever 476 clockwise (Fig. 4) which rocks the bell crank 481 clockwise and the latter rocks the lever 484 counterclockwise to a position where it will interfere with the action of pass-by pawl 451. When the arm 450 carrying the pass-by pawl 451 rocks counterclockwise, the pass-by pawl will be disabled by the lever 484 so that at the beginning of the second half of the machine cycle, said pass-by pawl will not engage the stud 456 and will not rock the three-armed member 453.

The lever 476 (Fig. 4) also has a forward curved extension 487 positioned over a lateral lug 488 on the link 461. When said arm 476 is rocked clockwise by the carriage control roll 470 as above explained, the curved arm 487 operating on the lug 488 moves the rear end of the link 461 downward so that the shoulder 462 is out of the path of the stud 463 and, consequently, the link 461 will not be active to rock the registering mechanism into engagement with the actuators.

Thus, in the non-add operation just described, the main registering mechanism will not be rocked into engagement with the actuators near the end of the forward stroke of the machine cycle but remains out of engagement with the actuators while the latter are returned to normal during the return stroke.

At the end of such an operation, the main registering mechanism would, in the absence of other provisions, be out of engagement with the actuators. This is an acceptable condition for addition or subtraction operations during the next cycle, but, for taking a total from the main registering mechanism, the latter should be in engagement with said actuators. To provide for this condition, a link 497 (Fig. 4) is connected to the register frame 455, said link being provided with a shoulder 498 positioned for engagement by a stud 499 on the lever 450 of the 800 section. Near the end of a machine cycle stud 499 engages shoulder 498 and rocks the registering mechanism into engagement with the actuators if it is not already engaged with the actuators. After this occurs a stud 499ª on the lever 450 of the 800 section engages the tail of link 497 and moves it upwardly to inactive position.

When the machine is given a cycle of operation in the column 1 position of the carriage, the control roll 470 is active and, since the regular motor bar 5 does not affect this control, the main register is non-added during the machine cycle initiated in column 1 initiated by the regular motor bar.

When the regular motor bar 5 is depressed with the carriage in its No. 5 columnar position, which is the operation in Example No. 1, a control roll 471 exactly like 470 is active to non-add the main register and, while some portions of the machine are momentarily blocked against operation while the carriage returns toward its No. 1 column in which the machine cycle is completed, nevertheless the main register remains non-added throughout its cycle. This is because the control roll 471 places the main register in non-add condition for the portion of the cycle occurring in column 5 where, after which the toggle 270, 271 locks the machine against completion of the cycle while the carriage returns through columns 4, 3 and 2, and, as the carriage moves out of column 2 toward column 1, and the toggle 471—472 is released to permit completion of the machine cycle another control roll 472 holds the main register in non-add condition. The control roll 472 is similar to 470 and it acts to prevent engagement of the main register 26, 27 with the actuators when the machine commences the return stroke of the cycle of operation as the carriage moves from its No. 2 to its No. 1 columnar position. This control roll is also concerned with non-adding the machine under certain other conditions that presently will be explained.

*Control of registering mechanism when auxiliary motor bar is depressed*

If a customer is to be billed for both gas and electricity, it is desirable to add the two charges together and, as previously explained, when operating the machine to make out such a bill, after the item has been entered on the keyboard with the carriage in column 5 for the first line of the bill, the auxiliary motor bar 150 (Fig. 2) is depressed. Depression of the auxiliary motor bar 150 disables the non-add mechanism as follows.

Referring to Fig. 2, the stem 151 of the motor bar 150 carries a stud 490 positioned over the edge of an arm 491 fixed to a shaft 492. This shaft extends across the rear of the machine and on its left-hand end (Fig. 4), it has an arm 493 fixed to it, said arm and the shaft 492 with the parts connected to it being urged counterclockwise as viewed in Fig. 4 by a spring 494. The free end of the arm 493 has a cam edge adapted to engage a stud 495 on the upwardly extending arm of the bell crank 481. The arrangement of the parts is such that, when the motor bar 150 is depressed, the shaft 492 is rocked clockwise (Fig. 4) and the end of arm 493 engaging said stud 495 rocks the bell crank 481 counterclockwise. This results in rocking the lever 484 to inactive position. Also, the bell crank 481 raises the link 480 and moves the lever 476 counterclockwise so that, in spite of the fact that the control roll 471 on the carriage conditions the parts for non-adding, depression of the motor bar 150 will restore the parts to normal, or disable the non-add mechanism to place the main register in its normal add condition. This is possible because the forward arm of lever 476 has a yielding connection with the remaining portion of the lever (Fig. 4).

The main register remains in add condition during the cycle initiated in column 5 because the motor bar 150 remains depressed until near the end of the second half of the machine cycle. The motor bar 150 is interconnected with the main motor bar mechanism through the bell crank 152 and the main motor bar is not released in the Burroughs machine until the three-armed member 185 (Fig. 3) is rocked counterclockwise by the full stroke sector 186 near the end of a machine cycle, said three-armed member operating the lever 496 (Fig. 3) to move a release slide that releases the hook 9 (Fig. 2). In the machine cycle initiated in column 5 the blocking action of the toggle 271—272 on shaft 3 prevents the full stroke sector from moving clockwise (Fig. 3) until the toggle is released as the carriage moves to column 1. Consequently, even though the control rolls 470, 471 and 472 are active as the paper carriage returns from its No. 5 to its No. 1 column, these control rolls will not non-add the machine because the non-add mechanism is held disabled by the motor bar 150 which remains depressed. The control roll 470 cannot act in column 1 to non-add the machine after the auxiliary motor bar 150 is released because the 800 shaft has by then effected a substantial part of its return movement and the registering mechanism has already been engaged with the actuators and the associated parts of the machine have been operated to such an extent that the control roll has no effect.

After the first line of entries has been made, the carriage stops in its No. 1 column, where the second entry is made in that column and the machine given a cycle by depression of the regular motor bar, after which the carriage moves to its No. 5 columnar position again. After the second entry for columns 2 to 5 have been set up on the keyboard, the machine is given another cycle during which the entry must be printed in columns 5, 4, 3 and 2 and also be added in the main register and after which the carriage must return to column 5 preparatory to printing the total in the third line in columns 2 to 5. The cycle of operation for printing the entry in the second line in columns 2 to 5 is initiated by depression of the special motor bar 170, the operation being like those for printing the entries in columns 2, 3, 4 and 5 in the first and second lines in Fig. 1.

*Control of registering mechanism when special motor bar is depressed*

After the carriage moves to its No. 5 column in the first line of entries in Fig. 1, the operator depresses the "special" motor bar 170 (Figs. 2 and 3) to initiate a machine cycle during which the carriage is returned slightly past its No. 2 columnar position and then moved back again to its No. 5 position instead of going to column 1. In this example, it is desired to add the amount of the first charge for gas or electricity to the amount of an item of merchandise. Consequently, the machine must not be non-added during cycles initiated by the "special" motor bar 170.

Figure 3:
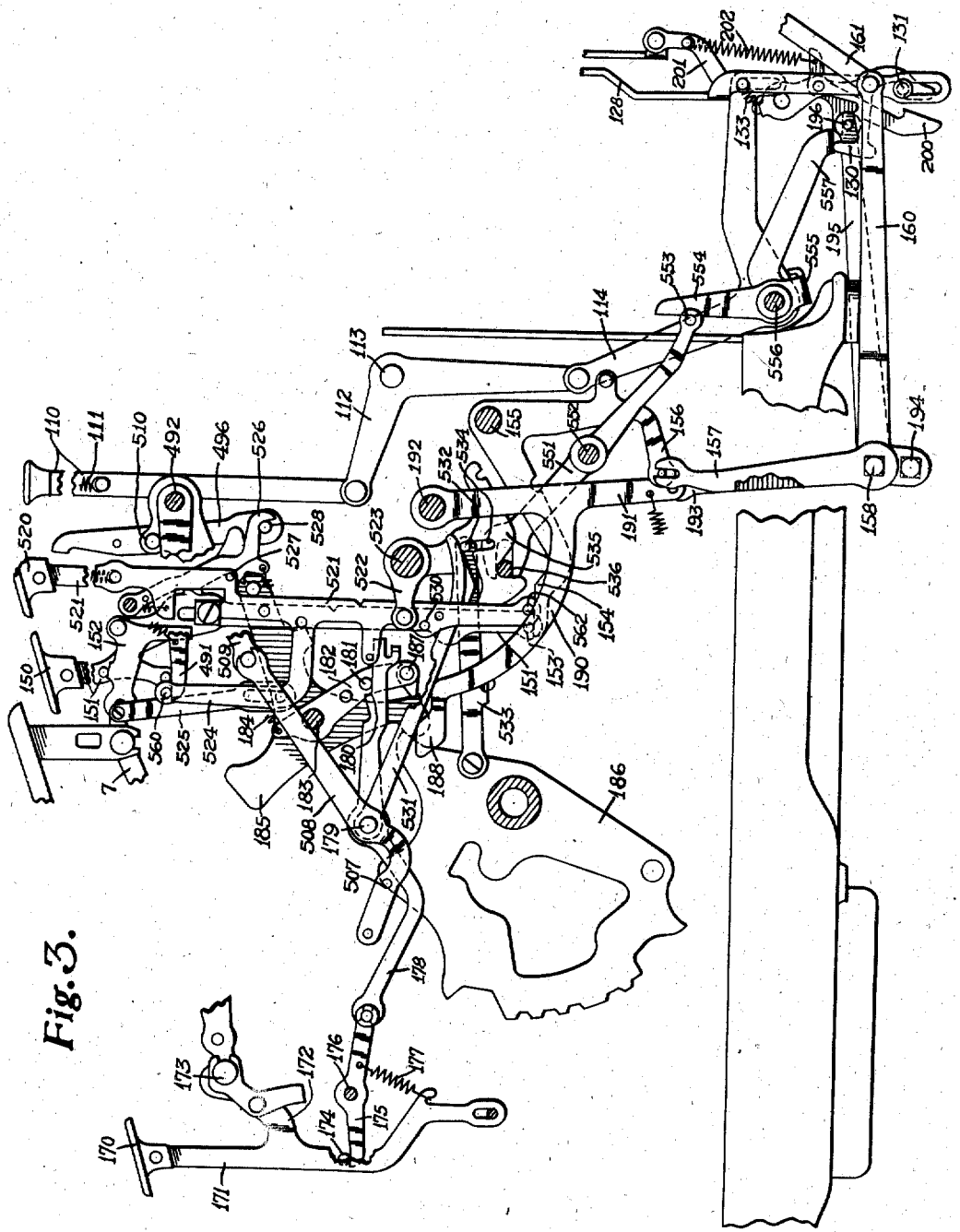
Fig. 3 is another right side elevation similar to Fig. 2 but with some of the standard parts of the Burroughs machine omitted so as to illustrate the invention more clearly.

Referring to Figs. 2 and 3, the "special" motor bar 170, as previously explained, carries a stud 174 positioned over the edge of a lever 175 which, in turn, is connected to a lever 178 pivoted at 179. The lever 178 engages a stud 507 on a lever 508 pivoted at 179, which lever has a stud and fork connection at its rear end with an arm 509 journaled on the shaft 492. The arm 509 has a stud 510 (Fig. 3) overlying the edge of the arm 491 which is fixed to shaft 492. The arm 491 and shaft 492 are the same arm and shaft that are rocked by the "auxiliary" motor bar 150 to disable the non-add mechanism in the manner heretofore explained. Accordingly, when the "special" motor bar 170 is depressed, the arm 491 and shaft 492 will be rocked counterclockwise in Figs. 2 and 3, or clockwise in Fig. 4, and the non-add mechanism will be disabled. Thus, the machine will be placed in add condition in column 5 even though the control roll 471 calls for non-add, and said machine will remain in add condition as the carriage moves through columns 4, 3 and 2 and returns to column 5 owing to the fact that the "special" motor bar 170 is not released until the main motor bar mechanism is released because the two are interconnected. The main motor bar is not released until the second half of the cycle of the general operating means which does not start until the carriage leaves column 2. It will be recalled that the general operating means is released as the carriage moves out of column 2 toward column 1 at which time the non-add roll 472 is active, but has no effect because the "special" motor bar is held down. As the carriage starts back toward column 5 it moves off the control roll 472 and the general operating means operates while the carriage is moving through columns 2, 3, and 4 where there is no non-add roll. By the time the "special" motor bar 170 is released and the carriage reaches column 5, the machine has operated to such an extent that the non-add roll 471 in column 5 has no effect upon the cycle that is being completed.

The entries in the second line of Fig. 1 are made in the same way as the entries in columns 2, 3, 4 and 5 in line 1, that is, in a cycle initiated by depression of the "special" motor bar 170 while the carriage is in the column 5 position.

In this example of work, after the carriage has returned to its column 5 position after completion of the second line of entries, the total key 30 is depressed to obtain the next cycle. In order to obtain the total, the machine must not, of course, be placed in non-add condition, and the non-add mechanism is disabled by the total key and maintained disabled, as explained next.

*Control of registering mechanism when total key is depressed*

When the total key 30 (Fig. 4) is depressed to cause a total taking machine cycle, the bell crank 500 (Fig. 4) to which the total key is connected is rocked clockwise. Connected to this bell crank is a rearwardly extending link 501 having a downward projection carrying a stud 502. This stud is positioned to engage the cam edge of a pawl 503 pivoted on the forwardly extending arm of the bell crank 481, said pawl having a lug overlying the edge of the arm of the bell crank 481 with which it is held in engagement by a spring 504 which is sufficiently strong to overcome spring 478. When the total key is depressed, the link 501 is thrust rearwardly and the stud 502, acting on pawl 503, rocks the bell crank 481 counterclockwise to thereby restore the lever 484 to normal. The bell crank 481, acting through the link 480, raises the forward arm of lever 476 against the tension of spring 478 to permit the link 461 to be returned to normal by its spring 465.

Thus, depression of the total key 30 disables the non-add mechanism and restores the machine to add condition notwithstanding the action of control roll 471 in column 5. The non-add mechanism remains disabled because the total key is not released until near the end of the machine cycle and this cycle is not completed until after the carriage returns to its No. 1 column. Even though the control roll 470 is active in column 1, it does not return the machine to non-add condition because the total key remains depressed. Said total key is held depressed by an interlocking head 505 shown in Fig. 2, said interlock being standard in the Burroughs machine and being described in more detail in Kilpatrick Patent No. 928,981.

From all the above it will be apparent that, while the carriage control of the main registering mechanism is normally set to non-add the register, the non-add mechanism is disabled under the control of the motor bars 150 and 170 and the total key so as to obtain correct results in the examples of work that have been explained. This control of the non-add mechanism can, of course, be varied to suit different examples of work but the above is the preferred arrangement.

NORMALIZING THE MACHINE

As stated, one of the advantages of the invention is that the calculating machine may be used for ordinary operations. However, when it is used for printing public utility bills with a multiple print operation, it is set for a particular program and, if it is desired to use it for normal calculating operations, the program "set-up" and the special operations must be disabled so that the machine will be in normal condition.

Use is made of the vertical posting bar 520 (Figs. 2 and 3) for normalizing the machine. The stem 521 of this bar extends downwardly where it is connected to a lever 522 pivoted to the frame of the machine at 523 (Fig. 3), said lever serving to support and guide the lower end of the stem. The stem 521 has a forward extension 524 (Fig. 3) having a pin and slot connection with a link 525 connected to the lever 7 of the main motor bar mechanism. Thus, when the vertical posting bar 520 is depressed, the link 525 moves downwardly and operates the main motor control to cause a machine cycle. The vertical posting bar is latched in depressed position by a latch 526 which engages over a stud 527 in the stem 521 after the bar has been depressed. This latch is released by a stud 528 on the lever 496 of the key releasing mechanism which lever normally is rocked counterclockwise in the early part of the second half of each machine cycle.

The lower end of the stem 521 carries a stud 530 (Fig. 3) positioned over the edge of a lever 531, pivoted at 179. The rear end of this lever is positioned over a stud 532 carried by a link 533 connected to the full stroke sector 186. In normal operations, the link 533 is moved forwardly and returned rearwardly during each machine cycle, the stud 532 operating in a curved, substantially horizontal portion of an L-shaped slot 534 in a member 535 pivoted at 523. But, when the vertical posting bar 520 is depressed, the stud 530 on its stem engages the edge of lever 531 and rocks the latter clockwise whereupon the cam edge of said lever swings the link 533 to move the stud 532 downwardly into the vertical portion of the slot 534. The result is that, during the ensuing machine cycle, as the link 533 moves forward, the member 535 will be rocked clockwise and then returned counterclockwise to normal. As the member 535 is moved clockwise, its lower cam edge operates on a stud 536 carried by a slide 537 (Fig. 14) mounted on the machine frame to move said slide downward. This causes a stud 540 in the rear of said slide (Figs. 2 and 8) to move downwardly (Fig. 8) and said stud, acting in a cam slot in an arm 541 pivoted at 542 rocks said arm clockwise (Fig. 8). Midway of this arm is pivotally connected a slide 543 extending to the right in Fig. 8, the free end of the slide being supported for sliding movement by a stud 544 on the back plate 43. The right-hand end of the slide 543 has an abutment end 545 adapted to engage the tabulating pawl 52 that is moved upwardly during the return stroke of each machine cycle to engage the tab stop to operate the tabulating mechanism. The arrangement is such that, when the vertical motor bar 520 is depressed, and as the machine is given a cycle, the slide 543 is moved to the right in Fig. 8 to hold the tabulating pawl in inactive position so that when the tabulating slide 50 is raised later in the machine cycle, the tab pawl 52 cannot engage the tab stop, with the result that the tabulating mechanism is disabled.

The slide 543 also has an upward projection 546 (Fig. 8) positioned to engage a stud 547 on the spring held pawl 168. The latter is the pawl that has a lateral lug positioned to engage the rear edge of the pawl 64 which, it will be recalled, is the pawl that connects the slides 50 and 60 together so that the line spacing mechanism will be operated. The arrangement is such that, when the vertical motor bar is depressed, and as the machine starts a cycle, and when the slide 543 is moved to the right (Fig. 8), the pawl 64 will be moved to connect the two slides 50 and 60 so that the line spacing mechanism will be enabled.

In other words, when the vertical spacing bar 520 is depressed a machine cycle is initiated, the tabulating mechanism is disabled, and the line spacing mechanism is enabled. This vertical spacing bar operating as above described has been standard equipment on the Burroughs machine for many years, the connections between the stem of said bar and the main motor bar mechanism being varied somewhat, depending on how close to the main motor bar the stem of the vertical spacing bar can be located in particular machines.

Depression of the vertical spacing bar 520 also disables the multiple print feature. Referring to Fig. 8, the slide 543 that is moved to the right carries a stud 550 positioned to engage the edge of the lever 289 that controls the slide 283 that governs the toggle blocking lever 290. When the vertical spacing bar is depressed, and as the machine starts its cycle, the slide 543 moves to the right (Fig. 8) which moves the lever 289 clockwise, thereby moving the slide 293 to the right to remove the notch 294 from register with the stud 295 on the blocking lever 290. Consequently, the lever 290 is disabled from blocking the toggle breaking member 280 and the machine goes through its cycle in the normal manner.

Depression of the vertical spacing bar 520 also disables the carriage return mechanism. Referring to Fig. 3, the stud 536, that is moved downwardly by the member 535 at the beginning of the machine cycle initiated by the vertical spacing bar, is positioned in a slot in the upper end of a lever 551 pivoted at 552 to the machine frame. The lower end of this lever carries a stud 553 operating against an arm 554 on a yoke 555 pivoted at 556 to the machine frame. This yoke has a rearwardly extending arm 557 provided with a lateral lug (Fig. 7) positioned over the tail of the latch 130. When the vertical spacing bar is depressed, and as the machine starts its cycle, the lever 551 (Fig. 3) is rocked counterclockwise. This rocks the yoke 555 clockwise and the arm 557 of the latter rocks the latch 130 counterclockwise to a disabled position. This latch 130 is the latch which, in the column 5 position of the carriage sets the carriage return mechanism into operation. Thus, in the No. 5 column, where the carriage return mechanism is normally set into operation by depression of one of the motor bars, said mechanism is disabled when the vertical spacing bar is depressed.

Depression of the vertical spacing bar also disables the nonadd mechanism. The forward extension 524 (Fig. 3) on the stem 521 of the vertical spacing bar carries a stud 560 on its upper end positioned over the edge of the arm 491 (Fig. 2) that is connected to the shaft 492 that disables the nonadd mechanism in a manner heretofore explained. When the vertical spacing bar is depressed the arm 491 is rocked counterclockwise and this disables the nonadd mechanism and thereby places the machine in normal add condition.

Depression of the vertical spacing bar also disables the throat opening and ejecting means. The lower end of the stem 521 of the vertical spacing bar (Fig. 3) carries a stud 562 positioned over the edge of the bell crank 154 which, as previously explained, disables the throat opening and ejecting means when said bell crank is rocked counterclockwise. Depression of the vertical spacing bar, acting through stud 562, rocks said bell crank clockwise and thus disables said throat opening and ejecting means.

In the modification shown in Figs. 14–17, inclusive, two vertical spacing bars are shown. One is the bar 570 (Fig. 14). The stem 571 of this bar is connected by a projection 572 to the lever 6 of the main motor bar mechanism so that, when the vertical spacing bar 570 is depressed, a machine cycle will be initiated. The stem 571 of the bar carries a stud 572 positioned over the edge of the lever 574 pivoted at 575 to the machine frame. The rear end of this lever is connected to another lever 576 pivoted at 577 to the machine frame. The rear end of this lever 576 acts on the stud 536 on the slide 537 with the result heretofore explained, namely, the tabulating mechanism is disabled, the line spacing mechanism is enabled, the toggle blocking lever is disabled, and the control of the carriage return mechanism by the link 128 as controlled in column 5 is disabled.

A second vertical posting bar in the stem 580 (Fig. 14) is provided in the form of the invention shown in Figs. 14 to 17. The lower end of this stem carries a stud 581 positioned over the lever 576. Depression of this bar rocks said lever with the same result as depressing the vertical posting bar 570, except that the stem 580 is not connected to the main motor bar mechanism so that depression of the bar connected to stem 580 does not initiate a machine cycle.

To recapitulate, and considering both forms of the invention, means has been provided so that the operator can, by depressing a vertical posting bar after having entered an item on the machine, cause a normal operation thereof during which the machine will add, subtract or take a total or sub-total, as the case may be, without any interference from the special mechanism provided to obtain a multiple print according to the program for which the machine is set.

This vertical spacing bar can also be used to give the machine a spacing cycle in column 5 in the event a negative total occurs.

*Operation*

Several operations of the machine will be followed through in order to briefly review and summarize the description.

The operator starts with the carriage in column 1, where he inserts a public utility bill in the open throat of the front-feed carriage and then closes the carriage. First, the date keys are set for the day. The operator then enters the "present" meter reading, "888," on keys of one portion of the keyboard and the "previous" meter reading, "555," on keys of another portion of the keyboard. The regular motor bar 5 is then depressed, whereupon the machine goes through a cycle of operation during the latter part of which the carriage tabulates from its No. 1 to its No. 5 columnar position, where it stops. The registering mechanism is nonadded during this operation so that no amounts are entered in the register although these amounts are printed.

With the carriage in the No. 5 column the operator then enters the "consumption," "333" and the net amount due, $4.50, after which, assuming a bill with a single line of entries only, he depresses the regular motor bar 5. The machine starts on its cycle and at an appropriate point the consumption, the amount due, and the date are printed in the No. 5 column, after which the general operating means is temporarily blocked but the carriage return is immediately set into operation. The firing of the printing mechanism in column 5 has conditioned the oscillating mechanism so that the printing mechanism is immediately recocked. As the carriage moves through the No. 4 column, the printing mechanism is released, and it prints the "consumption," amount due and date in column 4. The items are not added in column 4 because the operation is that of the printing mechanism only and not of the calculating means. The firing of the printing mechanism in column 4 causes the oscillating means to immediately recock the printing mechanism again. As the carriage moves through columns 3 and 2, the same action takes place, the "consumption," amount due, and date being printed in each column except that the date is blocked out in column 2. As the carriage moves from column 2 to column 1, the printing mechanism is not released because there is no release roll for column 1, but the non-add mechanism is again conditioned to keep the machine in non-add condition, the general operating means is released, the carriage return mechanism is disconnected, and the carriage opening means is rendered active so that as the carriage moves to column 1 the calculating mechanism completes its cycle, the carriage is opened, and the ejecting means operates to eject the bill. In other words, the cycle started with the carriage in column 5 is completed with the carriage in column 1.

In the carriage actuated form of the invention, the operation is the same as far as the results are concerned but the prints in columns 4, 3, and 2 are caused by a cocking and release of the printing mechanism by the carriage itself.

If the bill is one having two lines, similar to the first line in Fig. 1, the operations are the same except that when the items in the first line are entered with the carriage in column 5, the operator depresses the auxiliary motor bar 150 (Fig. 2), in which event the machine operates as above described except that the non-add mechanism is disabled and when the carriage reaches the No. 1 column the front-feed throat is not opened and the sheet is not ejected. Instead, the carriage remains in closed position. The operator then sets up the entry to be printed in the second line in column 1 and depresses the main motor bar 5 to cause a machine cycle in which the entry is printed in column 1 and the carriage then tabulates to column 5. Thereupon, the operator sets up the entry to be printed in columns 2, 3, 4 and 5 in line 2 and then depresses the special motor bar 170 (Fig. 2). This disables the nonadd mechanism so that the item entered in column 5 goes into the main registering mechanism, after which the carriage moves through columns 4, 3 and 2 in each of which printing occurs but moves only slightly beyond column 2, after which it immediately returns to column 5, where the cycle is completed. If there is also an item of merchandise, the operator then enters the amount of the merchandise and depresses the special motor bar again and the same series of operations again occur except that, this time, the amount of the merchandise is printed in the several columns and added in the main register. With the carriage in column 5 again, the operator depresses the total key which again disables the nonadd mechanism and initiates a cycle of machine operation during which the carriage returns through columns 4, 3 and 2 in each of which printing of the total occurs to column 1 where the front-feed throat is opened and the sheet ejected.

It is to be understood that the construction shown is for purposes of illustration only and that variations may be made in it without departing from the spirit and scope of the invention as defined by the appended claims.

I claim:
1. A calculating machine of the class described having means for giving it cycles of operation, mechanism operable to perform a predetermined function during a cycle of operation of said machine, a traveling carriage, means operating during a cycle of operation of said machine to move said carriage to a new position after completion of a predetermined portion of said cycle, and means controlled by said carriage upon said movement of said carriage to cause said mechanism to perform said predetermined function before the end of said cycle.

2. A calculating machine of the class described having means for giving it cycles of operation, mechanism operable to perform predetermined functions during cycles of operation of said machine, a traveling carriage, means operating during a cycle of operation of said machine to move said carriage to a new position and to return it said carriage to a new position and to return it prior to completion of said cycle to the position from which it started, and means governed by said carriage in accordance with its movement to condition a portion of said mechanism to perform a predetermined function before the end of said cycle.

3. A calculating machine of the class described having calculating mechanism, means for giving said calculating mechanism a cycle of operation, a traveling carriage, an element moved by said cycling means as said calculating mechanism is given a cycle of operation, means controlled by said element for moving said carriage from one to the other of two positions prior to the completion of said cycle of operation of said calculating mechanism, and means controlled by portions of said carriage in each of said two positions for controlling the functional condition of portions of said calculating mechanism during said cycle of operation.

4. A machine of the class specified having means for giving it cycles of operation, printing mechanism, a traveling carriage, an element moved by said cycling means as said machine is given a cycle of operation, means controlled by said element for moving said carriage from one to the other of two positions after completion of a predetermined portion of said cycle, and means controlled by portions of said carriage in each of said two positions for controlling operation of said printing mechanism before termination of said cycle of operation.

5. A calculating machine of the class described having means for giving it cycles of operation, a general operating mechanism, calculating mechanism, a traveling carriage, means acting automatically when a predetermined portion of a cycle of operation of said machine has been performed to temporarily keep said general operating mechanism in a partially operated condition, means to move said record material support to a new position while said general operating mechanism is temporarily kept in said partially operated condition, means causing said general operating mechanism to complete its cycle of operation after a predetermined movement of said record material support, and means controlled by said record material support in accordance with its change in position for controlling the operation of said calculating mechanism during the completion of said cycle.

6. A machine of the class described having means for giving it cycles of operation, general operating mechanism, a printing mechanism indexable and operable by said general operating mechanism in machine cycles, a movable record material support, means operating during a cycle of operation of said machine and after indexing of said printing mechanism to temporarily keep said general operating mechanism in a partially operated condition, means to move said record material support while said general operating mechanism is temporarily kept in said partially operated condition, means causing said general operating mechanism to complete its cycle of operation after a predetermined movement of said record material support, and means controlled by said record material support in accordance with said movement thereof for controlling the operation of said printing mechanism before the end of said cycle.

7. A calculating machine of the class described having a driving means, mechanism adapted to be given cycles of operation, means for causing said driving means to give said mechanism cycles of operation, a traveling carriage, means acting automatically when a predetermined portion of a cycle of operation has been completed to temporarily keep said mechanism in a partially operated condition, means to move said carriage to a new position while said mechanism is temporarily kept in said partially operated condition, means to disable said retaining means when said carriage reaches said new position, mechanism for performing a predetermined function, and means controlled by said carriage in accordance with its change in position for conditioning the last-named mechanism to perform said predetermined function before the end of said cycle.

8. A calculating machine having a driving means, mechanism adapted to be given cycles of operation, means for causing said driving means to give said mechanism a portion of a cycle of operation, a traveling carriage, an element that is moved as said mechanism is given said portion of its cycle, means controlled by said element to move said carriage when said portion of the cycle of said mechanism is completed, mechanism for performing a predetermined function, means governed by said carriage in accordance with said movement thereof to condition said last-named mechanism to perform said predetermined function before the end of said machine cycle, and means for causing said first-named mechanism to complete the remaining portion of its cycle after said movement of said carriage.

9. A calculating machine of the class described having a general operating mechanism, a driving means for giving said general operating mechanism cycles of operation, a traveling carriage, means operable automatically when a predetermined portion of a cycle has been performed to temporarily retain said general operating means in partially operated condition, means automatically moving said carriage while said general operating means is retained in its partially operated condition, means governed by said carriage controlling the operation of portions of said machine during said machine cycle in accordance with the change in position of said carriage, means automatically causing said general operating means to complete its cycles of operation after said carriage has reached a predetermined position, and means to render said retaining means ineffective in selected cycles of operation of said general operating means.

10. A machine of the class described having means for driving it through cycles of operation, a printing mechanism, means operated from said driving means in said machine cycles for indexing said printing mechanism to condition it to print predetermined amounts, a record material support movable back and forth in a columnar direction, means operating automatically during a machine cycle to rapidly move said support through a plurality of columnar positions, and means to cause said printing mechanism to be repeatedly operated to print in each of said columnar positions as said support is moved through said columnar positions and while said printing mechanism remains indexed.

11. A machine of the class described having means for driving said machine through cycles of operation, a printing mechanism indexable in accordance with data to be printed and operable to print indexed data, means operable from said driving means in machine cycles for indexing said printing mechanism, a traveling carriage for controlling columnar relation between said printing mechanism and record material, means operating automatically in machine cycles for rapidly moving said carriage through a plurality of columnar positions while said printing mechanism remains indexed, and means for causing said printing mechanism to effect a plurality of printing impressions while said carriage is being moved to thereby cause the indexed amount to be printed in a plurality of predetermined columns on the record material.

12. A machine of the class described having means for driving it through cycles of operation, a printing mechanism indexable in accordance with data to be printed and operable to print indexed data, means operable from said driving means in machine cycles for indexing said printing mechanism to condition it to print predetermined amounts, a traveling carriage controlling relative position between said printing mechanism and record material, means automatically operating during a machine cycle to rapidly move said carriage through a plurality of printing positions, means automatically operating to cause said printing mechanism to effect a plurality of printing impressions on said record material as said carriage is moved through said positions and while said printing mechanism remains indexed, and means governed by said support for determining the number of said printing impressions made by said printing mechanism.

13. A machine of the class described having a printing mechanism capable of being indexed in accordance with data to be printed and operable to print indexed data, means for indexing said printing mechanism, a movable record material support, means for rapidly moving said support through a plurality of printing positions, and means actuated by said support as it is moved through said positions and while said printing mechanism remains indexed to operate said printing mechanism a plurality of times to print in each of said printing positions.

14. A machine of the class described having means to drive it through cycles of operation, a printing mechanism indexable in accordance with data to be printed and operable to print indexed data, means operable from said driving means in machine cycles for indexing said printing mechanism, a movable record material support, means for rapidly moving said support through a plurality of printing positions, and means operated by said driving means and controlled by said support as it is moved through said positions and while said printing mechanism remains indexed, to operate said printing mechanism a plurality of times to print in each of said printing positions.

15. A machine of the class described having an electric motor for driving said machine, a printing mechanism indexable in accordance with data to be printed and operable to print indexed data, means operable from said motor in machine cycles for indexing said printing mechanism, a traveling carriage controlling relative columnar positioning between said printing mechanism and record material, means for rapidly moving said carriage through a plurality of columnar positions while said printing mechanism remains indexed, and means actuated by said motor and controlled by said carriage for causing said printing mechanism to be repeatedly operated while said carriage is moving to thereby cause the indexed item to be printed a plurality of times in different columns on said record material.

16. A machine of the class described having a general operating mechanism, a motor for driving said general operating mechanism through cycles of operation, a printing mechanism comprising portions indexable in accordance with data to be printed and portions capable of being cocked and fired to cause printing impressions to be made, indexing means operable by said general operating means in machine cycles for indexing said indexable portions, a movable record material support, means for rapidly moving said support through a plurality of printing positions, means operated by said motor and conditioned by said cocked portions of said printing mechanism as they are fired for recocking said portions immediately after firing and independently of said general operating mechanism, and means controlled by said support for firing said cocked portions while said support is moving for causing the indexed item to be printed in each of a plurality of positions on record material on said support.

17. A machine of the class described having means for driving it through cycles of operation, a printing mechanism comprising indexable type, means operable from said driving means in machine cycles for indexing said type, a traveling carriage, means for temporarily retaining said type in indexed position, means for causing a relative movement between said carriage and said printing mechanism while said type are kept indexed, means for causing said printing mechanism to be operated to print a plurality of times while said type remain indexed, and means for disabling said retaining means to permit return of said type to unindexed position after said plurality of printing operations.

18. A machine of the class described having means for giving it cycles of operation, a printing mechanism comprising indexable type, means for indexing said type, a traveling carriage, means for temporarily keeping said printing mechanism indexed, means for causing a relative movement between said carriage and said printing mechanism while said type are kept indexed, means governed by said carriage for causing said printing mechanism to be operated to print a plurality of times while said type remain indexed and while said relative movement is occurring, and means governed by said carriage for restoring said type to unindexed position after said plurality of printing operations.

19. A machine of the class described having means for giving it cycles of operation, record material supporting means, a printing mechanism comprising indexable type, means for indexing said type, means to retain said type temporarily in indexed condition, means for moving said record supporting means while said printing mechanism remains indexed, means for operating said printing mechanism repeatedly while said relative movement is occurring to effect printing in a plurality of positions on the record material, and means controlled by said record supporting means for returning said printing mechanism to a normal unindexed condition after said repeated printing has been effected.

20. A machine of the class described having means for driving it through cycles of operation, a printing mechanism comprising indexable type, means operable from said driving means in machine cycles for indexing said type, means for keeping said type temporarily in indexed positions, a traveling carriage, means for causing said carriage to be rapidly moved away from its initial position through a plurality of positions and returned to said initial position, means for causing said printing mechanism to be operated a plurality of times while said type remain indexed and while said carriage is being moved, and means for restoring said type to unindexed position after said plurality of printing operations.

21. The combination in a machine of the class described having means for driving it through cycles of operation, a printing mechanism comprising indexable type, means operable from said driving means in machine cycles for indexing said type, said printing mechanism normally being operated to print once during a machine cycle and returned to nonindexed condition after printing, and a movable record material support; of means for temporarily keeping said type in indexed condition, means for rapidly moving said record material support through a plurality of printing positions while said type are kept indexed, means for operating said printing mechanism to print a plurality of times while said type remain indexed and while said support is being moved, and means for restoring said type to nonindexed condition after said plurality of printing operations.

22. A machine of the class described having general operating mechanism, motor-driven means for giving said general operating mechanism cycles of operation, a printing mechanism comprising indexable type, means operable from said general operating mechanism in machine cycles for indexing said type, a traveling carriage, means to rapidly move said carriage through a plurality of positions while said type remain indexed, and motor-driven means operating independently of the means for cycling the general operating mechanism for operating said printing mechanism to print a plurality of times while said type remain indexed and said carriage is in different ones of said positions.

23. A machine of the class described having general operating mechanism, motor-driven means for giving said general operating mechanism cycles of operation, a printing mechanism comprising indexable type, means operable from said general operating mechanism in machine cycles for indexing said type, a traveling carriage, means to rapidly move said carriage through a plurality of positions while said type remain indexed, motor-driven means operating independently of the means for cycling the general operating mechanism for operating said printing mechanism to print a plurality of times while said type are indexed and said carriage is in different ones of said positions, and means governed by said carriage for controlling said printing mechanism to control the number of said printing impressions.

24. A machine of the class described having general operating mechanism, motor-driven means for giving said general operating mechanism cycles of operation, a printing mechanism comprising indexable type, means operable from said general operating mechanism for indexing said type, a traveling carriage, means to move said carriage rapidly and without interruption through a plurality of positions while said type remain indexed, motor-driven means operating independently of the means for cycling the general operating mechanism for operating said printing mechanism to print a plurality of times while said carriage is moving through different ones of said positions, and means governed by said carriage for controlling said printing mechanism to control the number of said printing impressions.

25. A machine of the class described having motor driving means, a general operating mechanism, means for causing said motor driving means to give said general operating mechanism cycles of operation, a printing mechanism having indexable portions, means operable from said general operating mechanism for indexing said indexable portions, a movable record material support, means operable from said driving means independently of said general operating mechanism for rapidly moving said record material support through a plurality of printing positions, means for applying power from said motor driving means to repeatedly operate said printing mechanism independently of said general operating mechanism, and means governed by said record material support for controlling said printing mechanism to determine the number of printing impressions made by said printing mechanism.

26. A machine of the class described having means for driving it through cycles of operation, a general operating mechanism, a printing mechanism comprising indexable type, means operable from said general operating mechanism in machine cycles for indexing said printing mechanism, a traveling paper carriage movable laterally in a columnar direction, said paper carriage being provided with paper holding devices and with means for conditioning portions of said machine for predetermined functions, means operating during a cycle of said general operating mechanism to rapidly move said carriage through several columnar positions while said type remain indexed, and means automatically operating during said cycle of the general operating mechanism to repeatedly operate said printing mechanism a plurality of times to cause the indexed item to be printed in a plurality of different predetermined columns on the paper held by said carriage.

27. A machine of the class described having means for driving it through cycles of operation, a printing mechanism comprising indexable type, means operable from said driving means in machine cycles for indexing said type, a movable record material support, means operating during a machine cycle to rapidly move said record material support through a plurality of printing positions, and means controlled by said movable record support for operating said printing mechanism a plurality of times before the end of said cycle.

28. A machine of the class specified, having a driving means, mechanism adapted to be given cycles of operation, means for causing said driving means to give said mechanism a portion of its cycle of operation, a printing mechanism indexable in accordance with data to be printed and operable to print indexed data, means operable from said first-named mechanism for indexing said printing mechanism, a traveling carriage, an element moved as said first-named mechanism is given said portion of its cycle, means controlled by said element to move said carriage when said portion of the cycle of said mechanism is completed, means governed by said carriage in accordance with its movement for causing said printing mechanism to be repeatedly operated to print while it remains indexed, and means controlled by said carriage for causing said driving means to move said first-named mechanism through the remaining portion of its cycle after said carriage has reached a predetermined position and said printing mechanism has been operated to print a predetermined number of times.

29. A machine of the class specified, having a driving means, mechanism adapted to be given cycles of operation, means for causing said drive means to give said mechanism a portion of its cycle of operation, a printing mechanism indexable in accordance with data to be printed and operable to print indexed data, means operable from said first-named mechanism for indexing said printing mechanism, a traveling carriage, an element moved as the first-named mechanism is given said portion of its cycle with said carriage in one position, means controlled by said moved element to move said carriage to another position when said portion of the cycle of said mechanism is completed, means governed by said carriage to operate said printing mechanism to print a plurality of times as said carriage is moved, means controlled by said carriage for causing said drive means to complete the cycle of operation of said first-named mechanism when said carriage has reached said other position, and means to move said carriage from said other position back to the position occupied at the start of said cycle as said cycle is completed.

30. A machine of the class specified having mechanism adapted to be given cycles of operation, drive means to give said mechanism a portion of its cycle of operation, a printing mechanism indexable in accordance with data to be printed and operable to print indexed data, means operable from said first-named mechanism for indexing said printing mechanism, a traveling carriage, means for moving said carriage, conditioning means selectively operable in two ways, an element moved as the first-named mechanism is given said portion of its cycle with said carriage in one position, means conditioned by said conditioning means and controlled by said moved element to cause said carriage-moving means, as said portion of said cycle is completed, to move said carriage from said position to either one of two positions in accordance with the way in which said conditioning means has been operated, and means for causing said drive means to complete the cycle of operation of said general operating mechanism after said carriage has completed a predetermined movement.

31. A calculating machine of the class described having means for giving it cycles of operation, a general operating means given a cycle of operation during each machine cycle, calculating mechanism operated by said general operating means, a traveling carriage, a printing mechanism indexable in accordance with data to be printed and operable to print indexed data, indexing means for said printing and calculating mechanisms operable by said general operating means, means operating during a machine cycle to temporarily keep said general operating means in partially operated condition while said printing mechanism remains indexed, means to move said carriage while said general operating means remains in its partially operated condition, means to operate said printing mechanism to print repeatedly while said carriage is moved, means controlled by said carriage in a position to which the latter is moved prior to the completion of said cycle to condition said calculating mechanism for a predetermined function, and means for causing said general operating means to complete its cycle of operation after said repeated printing operations have occurred.

32. A calculating machine of the class described having means for giving it cycles of operation, calculating mechanism, a printing mechanism indexable in accordance with data to be printed and operable to print indexed data, means for indexing said calculating and printing mechanisms, a general operating means actuating and restoring said indexing means and given a cycle of operation in each machine cycle, a traveling carriage, means automatically operating during a machine cycle to temporarily hold said general operating means in a partially operated condition with said printing mechanism remaining indexed, means for moving said carriage while said general operating means is held and said printing mechanism indexed, means controlled by said carriage for operating said printing mechanism to print a plurality of times during the excursion of said carriage, means controlled by said carriage in a position to which the latter is moved prior to the completion of said cycle to condition said calculating mechanism for a predetermined function, and means controlled by said carriage for disabling said holding means at a predetermined point in the excursion of said carriage to enable said general operating means to complete its operation while the carriage is completing its excursion.

33. A machine of the class described having a motor driving means for giving it cycles of operation, a printing mechanism indexable in accordance with data to be printed and capable of being cocked and fired to make printing impressions, means for indexing said printing mechanism, a general operating means controlling said indexing means and adapted to be given a cycle of operation by said driving means during a machine cycle, a traveling paper carriage, means for moving said carriage, means automatically operating during a machine cycle to temporarily keep said general operating means in a partially operated condition with said printing mechanism remaining indexed, means for causing said carriage moving means to move said carriage through a plurality of printing positions while said general operating means is kept in its partially operated condition, mechanism operated by said motor and conditioned by said printing mechanism when it is fired to cause said printing mechanism to be recocked immediately after having been fired, means controlled by said carriage for firing said printing mechanism as said carriage moves to thereby cause the indexed data to be printed in each of a plurality of columns on record material supported on said moving carriage, and means automatically releasing said general operating means after said repeat prints have occurred to enable said general operating means to complete its cycle.

34. A machine of the class described having means for giving it cycles of operation, a printing mechanism indexable in accordance with data to be printed and capable of being cocked and fired to print indexed data, means for indexing and means for cocking said printing mechanism, a general operating means controlling said indexing and cocking means and given a cycle of operation during each machine cycle, a traveling paper carriage, means automatically operating during a machine cycle to temporarily keep said general operating means in a partially operated condition with said printing mechanism remaining indexed, means to move said carriage through a plurality of columnar positions while said general operating means is kept in its partially operated condition, means actuated by said carriage for cocking and releasing said printing mechanism a plurality of times while said carriage is moving to thereby print the indexed data in each of a plurality of columns on record material held by said carriage, and means controlled by said carriage for releasing said general operating means after said repeated prints have occurred to enable said general operating means to complete its cycle.

35. The combination in a machine of the class described having means for giving it cycles of operation, general operating mechanism given a cycle of operation during each machine cycle, a printing mechanism indexable in accordance with data to be printed and normally operable by said general operating mechanism, means controlled by said general operating mechanism for indexing said printing mechanism, said printing mechanism normally being operated to print once during each machine cycle and being returned to unindexed condition after being operated, a record material support, and means for moving said support to change the relative position of said printing mechanism and support; of special devices associated with said machine and comprising means operable automatically during a machine cycle to temporarily hold said general operating mechanism in partially operated condition while said printing mechanism remains indexed, means for causing said support moving means to move said record material support while said general operating mechanism is so held, means for operating said printing mechanism a plurality of times while said general operating mechanism is held, and means for releasing said general operating mechanism after said plurality of printing operations; and normalizing means for disabling said special devices.

36. A machine of the class described having means for driving it through cycles of operation, a general operating means operable from said driving means in machine cycles, a printing mechanism, means operable from said general operating means in machine cycles for indexing said printing mechanism, means operable from said general operating means to cock and fire said printing mechanism in machine cycles, motor-driven additional means for cocking said printing mechanism, additional means for firing said printing mechanism, and means controlled by said printing mechanism to cause said motor-driven additional cocking means to cock said printing mechanism immediately after it has been fired.

37. A machine of the class described having motor-driving means for giving it cycles of operation, a traveling carriage, means for moving said carriage during a machine cycle, a printing mechanism, means for indexing said printing mechanism, means driven by said motor-driving means for cocking said printing mechanism, means controlled by said carriage for firing said printing mechanism during a machine cycle, and means controlled by said printing mechanism to cause said cocking means to cock said printing mechanism immediately after it has been fired.

38. A machine of the class described having motor-driven means for driving it through cycles of operation, printing mechanism capable of being cocked and fired, means for firing said general operating means driven by said driving means in machine cycles, printing mechanism, a normally inactive oscillatable means for cocking said printing mechanism connections driven by said motor-driving means for driving said oscillatable means, means controlled by said general operating means to cause said motor-driving means to drive said connections, and means governed by said printing mechanism when it is fired to cause said oscillatable means to be oscillated by said connections to recock said printing mechanism immediately the latter has been fired.

39. A machine of the class described having means for giving it cycles of operation, a printing mechanism indexable in accordance with data to be printed and capable of being cocked and fired to print indexed data, means for indexing and means for cocking said printing mechanism, a general operating means controlling said indexing and cocking means and given a cycle of operation during each machine cycle, a traveling paper carriage, means automatically operating during a machine cycle to temporarily keep said general operating means in a partially operated condition with said printing mechanism remaining indexed, means to move said carriage through a plurality of columnar positions while said general operating means is kept in its partially operated condition, motor-driven means for cocking said printing mechanism, means for firing said printing mechanism, means controlled by said printing mechanism to cause said motor-driven cocking means to cock said printing mechanism immediately after it has been fired, means controlled by said carriage to cause said firing means to fire said printing mechanism a plurality of times while said carriage is moving to thereby print the indexed data in each of a plurality of columns on record material held by said carriage, and means controlled by said carriage for releasing said general operating means after said repeated prints have occurred to enable said general operating means to complete its cycle.

40. A machine of the class described having motor-driven means for giving it cycles of operation, a printing mechanism indexable in accordance with data to be printed and capable of being cocked and fired to print indexed data, means for indexing and means for cocking said printing mechanism, a general operating means controlling said indexing and cocking means and given a cycle of operation during each machine cycle, a traveling paper carriage, means automatically operating during a machine cycle to temporarily keep said general operating means in a partially operated condition with said printing mechanism remaining indexed, means to move said carriage through a plurality of columnar positions while said general operating means is kept in its partially operated condition, means for firing said printing mechanism, a normally inactive oscillatable means for cocking said printing mechanism, connections driven by said motor-driving means for driving said oscillatable means, and means governed by said printing mechanism when it is fired to cause said oscillatable means to be oscillated by said connection to recock said printing mechanism immediately the latter has been fired, means controlled by said carriage to cause said firing means to fire said printing mechanism a plurality of times while said carriage is moving to thereby print the indexed data in each of a plurality of columns on record material held by said carriage, and means controlled by said carriage for releasing said general operating means after said repeated prints have occurred to enable said general operating means to complete its cycle.

41. A machine of the class described having means for giving it cycles of operation, a general operating means given a cycle of operation during each machine cycle, a traveling carriage, a printing mechanism indexable in accordance with data to be printed and operable to print indexed data, indexing means for said printing mechanism operable from said general operating means, means operating during a machine cycle to temporarily keep said general operating means in partially operated condition while said printing mechanism remains indexed, means to move said carriage while said general operating means remains in its partially operated condition, means to operate said printing mechanism to print repeatedly while said carriage is moved, and means for causing said general operating means to complete its cycle of operation after said repeated printing operations have occurred.

42. A machine of the class described having means for giving it cycles of operation, a printing mechanism indexable in accordance with data to be printed and operable to print indexed data, means for indexing and means for cocking said printing mechanism, a general operating means actuating said indexing and cocking means and given a cycle of operation in each machine cycle, a traveling carriage, means automatically operating during a machine cycle to temporarily hold said general operating means in a partially operated condition with said printing mechanism remaining indexed, means for moving said carriage while said general operating means is held and said printing mechanism indexed, means controlled by said carriage for operating said printing mechanism to print a plurality of times during the excursion of said carriage, and means controlled by said carriage for disabling said holding means at a predetermined point in the excursion of said carriage to enable said general operating means to complete its operation while the carriage is completing its excursion.

ARTHUR J. FETTIG.

CERTIFICATE OF CORRECTION.

Patent No. 2,340,372.

ARTHUR J. FETTIG.

February 1, 1944.

It is hereby certified that error appears in the printed specification of the above numbered patent requiring correction as follows: Page 25, second column, lines 18 to 20 inclusive, claim 38, after "said" strike out "general operating means driven by said driving means in machine cycles," and insert the same before "printing" in line 17, same claim; and that the said Letters Patent should be read with this correction therein that the same may conform to the record of the case in the Patent Office.

Signed and sealed this 25th day of April, A. D. 1944.

Leslie Frazer (Seal)

Acting Commissioner of Patents.